US010007391B2

(12) United States Patent
Sabatelli et al.

(10) Patent No.: US 10,007,391 B2
(45) Date of Patent: Jun. 26, 2018

(54) INTERFACES FOR A SPIRIT LEVEL APPLICATION

(71) Applicant: APPLE INC., Cupertino, CA (US)

(72) Inventors: Alessandro F. Sabatelli, San Francisco, CA (US); Brian Andrew Schmitt, San Francisco, CA (US); Joshua Corey Weinberg, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 671 days.

(21) Appl. No.: 14/492,276

(22) Filed: Sep. 22, 2014

(65) Prior Publication Data
US 2015/0355786 A1    Dec. 10, 2015

Related U.S. Application Data

(60) Provisional application No. 62/009,818, filed on Jun. 9, 2014.

(51) Int. Cl.
G06F 3/0481 (2013.01)
G06F 3/0346 (2013.01)
G06F 3/0484 (2013.01)
G06F 3/01 (2006.01)
G01C 9/06 (2006.01)

(52) U.S. Cl.
CPC ............ G06F 3/0481 (2013.01); G01C 9/06 (2013.01); G06F 3/017 (2013.01); G06F 3/0346 (2013.01); G06F 3/04847 (2013.01)

(58) Field of Classification Search
CPC ..... G01C 9/06; G06F 3/0481; G06F 3/04847; G06F 3/0346; G06F 3/017
See application file for complete search history.

(56) References Cited

U.S. PATENT DOCUMENTS 5,687,280 A * 11/1997 Matsui ................... G10L 15/25
                                                                704/231
2005/0166410 A1 * 8/2005 Richter ................... G01C 9/06
                                                                33/366.12
(Continued)

OTHER PUBLICATIONS

Aircraft Gyroscope. Version 4.0 ready Aug. 4, 2011. Available at [http://www/caffeinatedconsuilting.com]. Retrieved [Mar. 21, 2017] from Internet Archive. 3 pages.*

(Continued)

Primary Examiner — Amy M Levy
(74) Attorney, Agent, or Firm — Morgan, Lewis & Bockius LLP

(57) ABSTRACT

In one mode of an interface, a bounded area is displayed on a mobile device. A straight line is displayed that divides the bounded area into first and second areas. An angle of the line indicates an orientation of a first axis of the mobile device relative to a respective vector. In response to detecting the change in orientation of the second axis of the device relative to the vector, while maintaining the angle of the line at a first angle, a relative size of the first and second areas is changed in accordance with the change in orientation of the second axis. In a second mode, first and second bounded shapes are displayed. Positions of the bounded shapes with respect to each other are changed along one or more axes in response to a change in orientation of a surface of the mobile device relative to a respective vector.

36 Claims, 18 Drawing Sheets

(56) References Cited

U.S. PATENT DOCUMENTS

| | | | | |
|---|---|---|---|---|
| 2007/0066363 | A1* | 3/2007 | Zhu | G06F 1/1626 455/566 |
| 2007/0180719 | A1* | 8/2007 | Donnelly | G01C 9/06 33/366.11 |
| 2009/0222776 | A1* | 9/2009 | Meers | G05B 9/02 716/106 |
| 2012/0121125 | A1* | 5/2012 | Dimov | G01W 1/12 382/103 |
| 2012/0166137 | A1* | 6/2012 | Grasser | G01C 15/00 702/150 |
| 2012/0218444 | A1* | 8/2012 | Stach | G06T 1/0021 348/241 |
| 2015/0045058 | A1* | 2/2015 | Rudow | H04M 1/72572 455/456.1 |
| 2016/0044575 | A1* | 2/2016 | Rajeevalochana | H04W 4/027 455/410 |

OTHER PUBLICATIONS

Tucker. [iPhone] Use your device as a laser level. Blog entry posted Nov. 4, 2012 at dotTech. Retrieved [Mar. 21, 2017] from [https://dottech.org/88414]. 6 pages.*

Macworld UK. iOS 7 available to download now. Blog entry posted Sep. 18, 2013. Retrieved [Apr. 7, 2017] from [http://www.macworld.co.uk/news/apple/]. 8 pages.*

Apple Press Info. Apple Unveils iOS 7. Blog entry posted Jun. 10, 2013. Retrieved [Apr. 7, 2017] from [http://www.apple.com/pr/library/2013/06/10]. 3 pages.*

Gyroscope Level. Publically available Oct. 23, 2010. Retrieved on [Mar. 21, 2017] from [http://caffeinatedconsulting.com/gyroscope_level]via Internet Archive. 2 pages.*

OSXDaily. iOS 7 Release Date: Sep. 18. Blog entry posted Sep. 10, 2013. Retrieved [Apr. 7, 2017] from [http://osxdaily.com/2013/09/10/]. 3 pages.*

Matt. How to use the iPhone 5 as a Level in iOS 7. Blog entry posted Sep. 20, 2013 at Solve Your Tech. Retrieved [Mar. 21, 2017] from [http://www.solveyourtech.com/useiphone5levelios7/ ]. 10 pages.*

Oremus, Will. The Niftiest iOS7 Feature You Haven't Found Yet, Blog entry posted Sep. 21, 2013 at Future Tense. Retrieved [Mar. 21, 2017]. 3 pages.*

Sorrel, Charlie. A Level: Virtual Spirit Level for IPhone. Blog entry posted Jul. 22, 2008 at Wired. Retrieved [Mar. 21, 2017] from [https://www.wired.com/2008/07]. 4 pages.*

DIY Maven. How to Turn Your iPhone into a Bubble Level (No Additional App Purchase Required). Blog entry posted Oct. 1, 2013 at Curbly. Retrieved [Mar. 21, 2017] from [http://www.curbly.com]. 7 pages.*

Korostoff, Kathryn. In Search of Useful Market Research Displays: Don't Forget Venn Diagrams. Blog entry post at Research Rockstar LLC. Nov. 3, 2009. Retrieved from [http://www.researchrockstar.com/praise-for-venn-market-research-example/] on [Aug. 6, 2017]. 5 pages.*

* cited by examiner

INTERFACES FOR A SPIRIT LEVEL APPLICATION

CROSS-REFERENCE TO RELATED APPLICATIONS

The present application claims priority from and is a nonprovisional application of U.S. Provisional Application No. 62/009,818, entitled "INTERFACES FOR A SPIRIT LEVEL APPLICATION" filed Jun. 9, 2014, the entire contents of which are herein incorporated by reference for all purposes.

BACKGROUND OF THE INVENTION

The present disclosure relates generally to mobile devices, and in particular to techniques for providing graphical interfaces for a spirit level application running on a mobile device based on user interactions with the mobile device.

Mobile devices, such as smart phones, tablet computers, media players, and the like, have become ubiquitous. A mobile device can have an operating system (OS), and can run various types of application software, sometimes called "apps." Mobile devices can also be equipped with sensors and global positioning system (GPS) capabilities. Mobile devices often come equipped with a touchscreen interface that acts as both an input and an output device.

For example, the iPhone® commercially available from Apple Inc. is a smart phone that includes a variety of components, such as a compass, a magnetometer, an accelerometer, a gyroscope, and a GPS. The iPhone®'s OS can use components to determine the iPhone®'s speed, current location, and physical orientation (e.g., portrait or landscape). The OS can detect events from these components and pass these events on to applications that are executing on the iPhone®. Those applications can then handle the events in a manner that is custom to those applications. For example, using its built-in components, the iPhone® can detect its spatial orientation or changes to its spatial orientation and pass events representing the changes to one or more applications that have registered an interest in such events. An application can then process and respond to the event.

Mobile devices such as the iPhone®, the iPad® and iPod Touch® from Apple Inc. come equipped with a sensors and a touchscreen interface that can detect physical contact from a user of the mobile device and movement of the device, and generate corresponding events. For example, the iPhone® can detect when a user has single-tapped the screen, tilted the iPhone® relative to a vector such as a gravity vector, or changed the orientation of the iPhone® relative to a force such as gravity. Each such user interaction relative to the iPhone can cause a different kind of corresponding event to be generated for consumption by interested applications. Thus, the iPhone®, iPad®, and iPod Touch® are able to detect and respond to a variety of physical interactions that a user can take relative those devices.

Often, users have mobile devices with them as they perform activities such as photography, do it yourself projects, and other activities that involve determining whether an object is level or plumb, determining the pitch or slope of a surface, or calculating an angle. A user of a mobile device configured to determine whether an object or surface is level or plumb, and to determine the pitch, slope, or angle of the surface could use such a device when performing these activities.

BRIEF SUMMARY OF THE INVENTION

The present disclosure relates generally to mobile devices, and in particular to techniques for providing graphical interfaces for a spirit level application running on a mobile device based on user interactions with the mobile device.

Some embodiments provide methods and systems for presenting graphical user interfaces for a spirit level application executing on a mobile device. The graphical user interfaces are updated responsive to sensor data indicative of the orientation of the mobile device. For example, sensor data associated with sensors such as an accelerometer, a gyroscope, a magnetometer (i.e., a magnetic field sensor), and a compass of a mobile device can be used to determine the movement and changes in orientation of a first axis of a surface of the mobile device relative to a respective vector. The first axis of the surface of the mobile device can be an axis passing through the center of the display. Examples of such axes include axis 406 and axis 408 shown in FIG. 4.

According to some embodiments, techniques (such as methods, systems, and computer-program products) are provided for displaying a graphical user interface of a spirit level application executing on a mobile device. A bounded area is displayed on a display of the mobile device. A straight line is displayed that divides the bounded area into a first area and a second area. An angle of the line indicates an orientation of a first axis of the mobile device relative to a respective vector. While maintaining the angle of the line at a first angle, the method detects a change in orientation of a second axis of the mobile device relative to the respective vector, and in response to detecting the change in orientation of the second axis of the mobile device relative to the respective vector, changes a relative size of the first and second areas in accordance with the change in orientation of the second axis of the mobile device relative to the respective vector.

According to some embodiments, a method is provided for displaying graphical elements in a spirit level application executing on a mobile device. The method includes displaying, on a display of the mobile device, a first bounded shape and a second bounded shape. The method further includes changing the positions of the bounded shapes with respect to each other along one or more axes in response to a change in orientation of a surface of the mobile device relative to a respective vector.

A better understanding of the nature and advantages of embodiments of the present invention may be gained with reference to the following detailed description and the accompanying drawings.

DETAILED DESCRIPTION OF THE INVENTION

Figure 1:
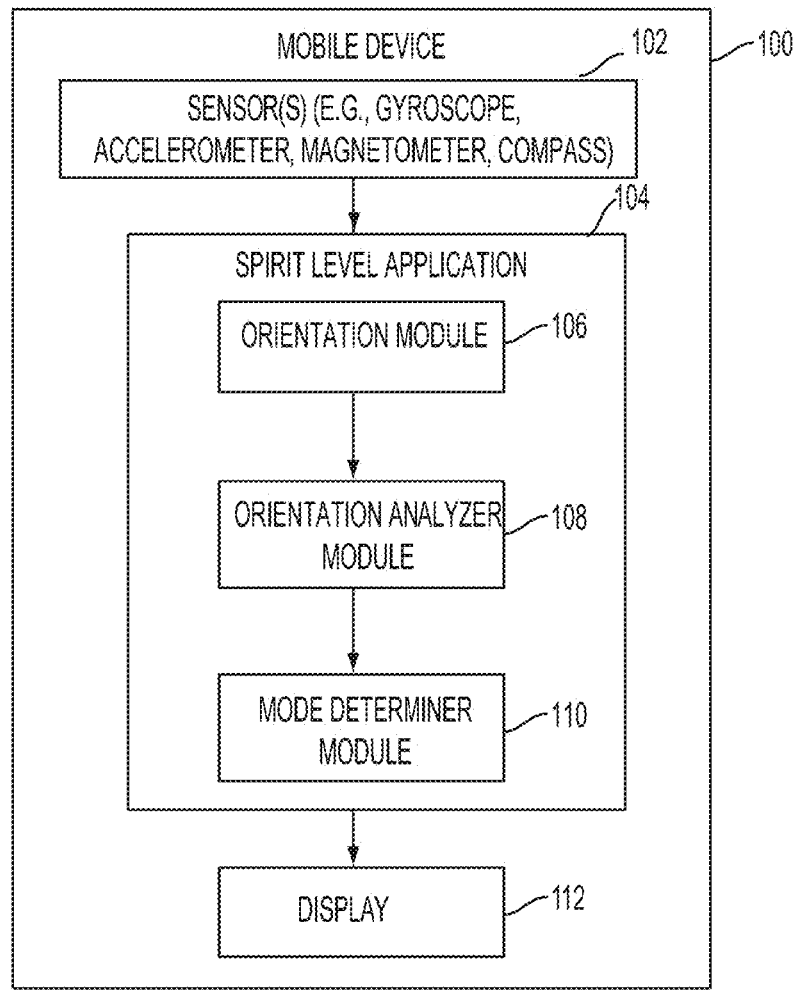
FIG. 1 is a block diagram of a mobile device according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to mobile devices, and in particular to techniques for providing graphical interfaces for a spirit level application running on a mobile device based on user interactions with the mobile device. A spirit level instrument is used to indicate whether a surface is horizontal (e.g., level relative to the horizon) or vertical (e.g., plumb relative to the horizon). A spirit level application running on a mobile device enables the mobile device to provide the functionality of a spirit level instrument. The spirit level application may provide a graphical user interface that outputs or displays information that indicates the position of the mobile device with respect to a reference position. For example, sprit level application may display the position of the mobile device with respect to a horizontal reference and also with respect to a vertical reference. In certain embodiments, the horizontal or vertical information may be provided based upon the orientation of a surface of the mobile device with respect to the horizontal and vertical reference positions.

According to embodiments, the spirit level application can display an interface indicating the mobile device's orientation relative to a respective vector. If the orientation of a first axis of a surface of the mobile device changes relative to the respective vector (e.g., if a pitch of the surface of the mobile device changes relative to gravity), the application displays graphical elements indicating the changes. If the orientation of a second axis of a surface of the mobile device changes relative to the respective vector (e.g., if a roll of the surface of the mobile device changes relative to gravity), the application displays graphical elements indicating the changes. In some embodiments, the first axis and the second axis are fixed (e.g., the first axis is a long axis of the display and the second axis is an axis perpendicular to the display). In some embodiments one or more of the first or second axes shifts based on an orientation of the device (e.g., the first axis is a long axis of the display when the display is in landscape orientation and the first axis is a short axis of the display when the display is in portrait orientation).

In certain embodiments, a spirit level application may be configured to display the orientation information (e.g., the orientation of the first axis of the surface of the mobile device relative to the respective vector) using display lines, bounded shapes, and values. The interface of the spirit level application is configured to indicate whether a surface of a mobile device is horizontal (e.g., level relative to the horizon) or vertical (e.g., plumb relative to the horizon). According to some embodiments, the respective vector is a gravity vector that is detected using one or more sensors of the mobile device. The interface is also configured to display a value indicative of the orientation of a first axis of the mobile device relative to the respective vector. In some embodiments, the value represents a difference, in degrees, between the orientation of the first axis of the mobile device and the respective vector and when the mobile device is rotated through 180 degrees relative to the respective vector, the interface indicates the same orientation relative to the respective vector.

Some embodiments can be used to determine the orientation (e.g., angle or degree of tilt) of a surface of a mobile device relative to the respective vector based on sensor data from the mobile device. The mobile device can have one or more sensors that provide the sensor data. The determination of the orientation can be used to present an interface of a spirit level application. The spirit level can display the orientation of the mobile device relative to a reference vector, where the reference can be a horizontal reference vector, a vertical reference (e.g., gravity vector), or a user-specified reference vector. In some instances, input can be received that indicates a user-defined reference vector of the mobile device.

For example, a mobile device can include certain types of sensors, such as, but not limited to, magnetometers, compasses, accelerometers, gyroscopes, pressure sensors, barometers, global positioning system (GPS) units, cameras and wireless circuitry. These sensors can generate sensor data, which can be used to determine the mobile device's orientation relative to a respective vector, such as, for example, a gravity vector detected using one or more of the device's sensors. In some embodiments where the mobile device is rectangular, the sensor data can be used to determine whether the mobile device is in a portrait orientation (e.g., with a shorter edge closer to the ground and substantially perpendicular to gravity) or in a landscape orientation (e.g., with a longer edge closer to the ground and substantially perpendicular to gravity). The sensor data can be analyzed to determine the physical orientation of the mobile device relative to a spatial axis that passes horizontally across a center of a display of the device. The sensor data can also be used to determine the orientation of a first axis of a surface of the device relative to a respective vector. In some embodiments, the surface is a display surface of the mobile device and the respective vector is a gravity vector that is detected using one or more sensors of the mobile device (e.g., one or more accelerometers).

Some embodiments can provide interfaces for a spirit level application running on a mobile device so that the device can use its sensor data to indicate the orientation of an axis of the mobile device relative to a respective vector. As further described below, many different interface modes and arrangements can be derived based on using the sensor data to graphically depict the mobile device's orientation relative to the respective vector. In some embodiments, an orientation of the interface can change from portrait mode to landscape mode based on the physical orientation of the mobile device relative to a physical spatial axis that passes horizontally across a center of a display of the mobile device.

According to embodiments, two modes are provided for presenting orientation information and the spirit level application display can transition between the two modes. For example a first mode (e.g., a vertical mode) may be provided in which the device is substantially upright and a z-axis extending outward from the display of the device is closer to perpendicular with the direction of gravity than parallel to the direction of gravity. A second mode (e.g., a horizontal mode) may be provided in which the device is substantially reclined and a z-axis extending outward from the display of the device is closer to parallel with the direction of gravity than perpendicular to the direction of gravity. The display of the spirit level application can transition between the first and second modes based on determining that the orientation of a surface of the mobile device relative to the respective vector has reached a predetermined threshold.

FIG. 1 is a block diagram of a mobile device 100 that uses sensor data to determine its physical orientation (e.g., portrait or landscape) and orientation relative to a respective vector (e.g., a gravity vector) according to embodiments of the present invention. FIG. 1 illustrates an example of a mobile device 100 having a touch-sensitive display 112 that presents an interface of a spirit level application. Mobile device 100 can be a smart phone such as an Apple iPhone®, for example. As illustrated in FIG. 1, mobile device 100 can include sensors 102 such as a magnetometer, a compass, a gyroscope, and an accelerometer. Sensors 102 can provide sensor data to a spirit level application 104. The spirit level application 104 can comprise an orientation module 106 configured to determine a physical orientation of mobile device 100 relative to a vector such as a gravity vector. As examples, sensors 102 can provide data used to determine if mobile device is in a portrait mode or a landscape mode relative to a gravity vector. Orientation module 106 can automatically adjust an interface of spirit level application 104 presented on display 112 of mobile device 100 in response to determining that mobile device has rotated so as to transition from portrait orientation to landscape orientation.

Once a physical orientation of the mobile device is determined, FIG. 1 depicts how the example mobile device 100 can then pass on sensor data to an orientation analyzer module 108. Orientation analyzer module 108 uses sensor data to determine orientation of a first axis of a surface of mobile device 100 relative to a respective vector. In some embodiments, the surface of the mobile device is a surface of display 112 and the respective vector is a gravity vector detected by one or more of sensors 102. According to embodiments, orientation analyzer module 108 determines the orientation of an axis of a surface of mobile device 100 relative to the respective vector. In some embodiments, the orientation is determined based on the degree of tilt or orientation of mobile device 100 relative to a gravity vector detected using sensors 102. In some embodiments, in response to receiving a touch input indicating a user-defined reference axis of the mobile device at display 112, orientation analyzer module 108 can determine orientation of the user-defined reference axis of the mobile device relative to the respective vector. The reference axis can be a spatial axis passing through the center of display 112 that is selected via a touch input at the surface when the device is at a desired orientation or angle relative to the respective vector. In this way, spirit level application 104 can indicate orientation of the mobile device relative to additional, user-selected axes relative to the respective vector. For example, while mobile device 100 is tilted to be aligned with a desired reference axis, a user can single-tap display 112 in order to select the reference axis. According to some embodiments, orientation analyzer module 108 will then determine orientation of the user-defined reference axis relative to the respective vector. Examples of these embodiments are described below with reference to the interfaces shown in FIGS. 15 and 16. While examples of the respective vector are described as being a gravity vector, it is to be understood that orientation analyzer module 108 can also determine orientation of the user-defined reference axis relative to a respective plane. The respective plane can be, for example, the horizon. For instance, display 112 can indicate whether a surface of a mobile device is horizontal (e.g., level relative to the horizon) or vertical (e.g., plumb relative to the horizon).

Mode determiner module 110 can use sensor data from sensors 102 to determine a mode of spirit level application 104 executing on mobile device 100. As discussed with reference to FIGS. 2 and 3 below, orientation analyzer module 108 can use sensor data from sensors 102 to determine an orientation of a surface of mobile device 100 relative to a respective vector, and mode determiner module 110 can then determine whether the orientation of the surface of the device relative to the respective vector has reached a predetermined threshold. In response to determining that the threshold has been reached, mode determiner module 110 can determine that whether spirit level application 104 should be in a vertical or horizontal mode. For example, if the tilt or orientation of a surface of mobile device 100 relative to the respective vector reaches a predetermined threshold, mode determiner module 110 can determine that the spirit level application needs to transition to a vertical mode. In some embodiments, the predetermined threshold is a tunable parameter expressed in terms of degrees of an angle between the surface of the mobile device and the respective vector. According to some embodiments, a default threshold used by mode determiner module 110 to determine that the spirit level application is to be transitioned to vertical mode is approximately 50 degrees. Also, for example, if the tilt or orientation of the surface of mobile device 100 relative to the respective vector falls below the predetermined threshold, mode determiner module 110 can determine that the spirit level application needs to transition to a horizontal mode. In accordance with embodiments, transitions between the horizontal and vertical modes of the spirit level application interface are seamless and occur automatically as the mobile device is tilted so that the angle of inclination reaches (or falls below) the threshold.

It will be appreciated that mobile device 100 is illustrative and that variations and modifications are possible. Mobile device 100 can have other capabilities not specifically described here (e.g., mobile phone, global positioning system (GPS), power management, various connection ports for connecting external devices or accessories, etc.). Further, while mobile device 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Some embodiments of the present invention can be realized in a variety of apparatus including electronic devices implemented using any combination of circuitry and software.

Figure 2:
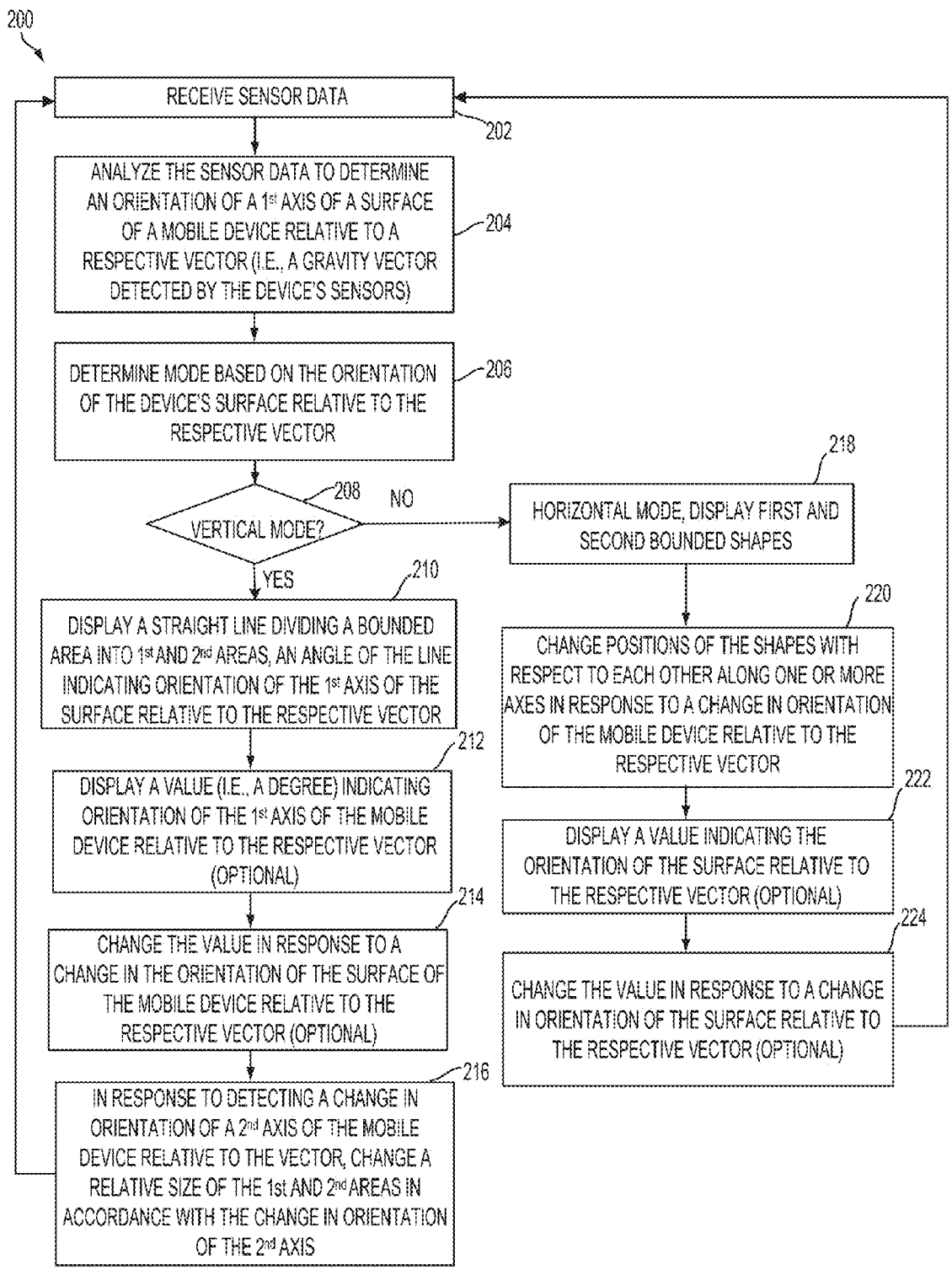
FIGS. 2 and 3 are flow diagrams of processes usable by a mobile device to present interfaces indicating orientation of a first axis of a surface of the mobile device relative a respective vector, according to embodiments of the present invention.

FIG. 2 is a flowchart illustrating a method 200 for presenting an interface indicating orientation of axes of a mobile device relative to a vector, according to embodiments of the present invention. In this example, a mobile device can execute modules of a spirit level application to carry out method 200.

At block 202, mobile device 100 can receive sensor data from one or more of its sensors. As previously mentioned, the one or more sensors can be sensors integrated in the mobile device. The sensors can include, for example, a magnetometer, a compass, an accelerometer, a gyroscope, pressure sensors, motion sensors, barometers, a GPS unit and wireless circuitry. The sensor data can be used to determine an orientation and orientation of axes of the mobile device relative to a respective vector. By way of example, referring to FIG. 1, mobile device 100 may receive sensor data from sensors 102, including one or more of a compass, a magnetometer, a gyroscope and an accelerometer.

In block 204, the sensor data is analyzed to determine an orientation of a first axis of a surface of the mobile device relative to a respective vector. In the example of FIG. 2, the respective vector can be a gravity vector detected by one or the device's sensors. The gravity vector can be calculated or determined based upon sensor data. By way of example, referring to FIG. 1, the analysis can be performed by orientation analyzer module 108.

In some embodiments, block 204 can include additional processing to detect a physical orientation of the mobile device relative to the respective vector based on sensor data received in block 202. Referring back to FIG. 1, mobile device 100 may receive sensor data from sensors 102 and the sensor data can be used by orientation module 106 to detect a current physical orientation (e.g., portrait or landscape) of a physical spatial axis that passes horizontally across a center of display 112 of mobile device 100 relative to the respective vector. In this way, method 200 can be used to display device-orientation-sensitive interfaces for a spirit level application. Examples of such device-orientation-sensitive interfaces are provided in FIGS. 4-17. For example, FIGS. 4, 6, and 9-12 illustrate portrait mode interfaces presented in response to detecting that a mobile device is in a portrait orientation, and FIGS. 5, 7, 8, and 13-17 depict landscape mode interfaces presented in response to detecting that a mobile device is in a landscape orientation.

In block 206, a mode for the spirit level application is determined based on the orientation determined in block 204. As shown, block 206 can determine a mode of the interface based on the orientation of the device's surface relative to the respective vector. This orientation can be compared to a predetermined threshold to determine that the interface needs to be presented in one of two modes (e.g., a vertical mode or a horizontal mode). The mode can be determined based determining that the orientation of the surface of the mobile device relative to the respective vector has reached the predetermined threshold. For example, referring back to FIG. 1, mode determiner module 110 may determine that spirit level application 104 is in a vertical mode if display 112 is tilted or oriented at an angle greater than a predetermined number of degrees relative to the respective vector. According to some embodiments, the predetermined threshold is a tunable parameter that can be adjusted by a user of the mobile device.

In decision block 208, a determination is made as to whether the mobile device is in vertical mode or not. If it is determined that the device is in vertical mode, then method 200 continues to block 210. Otherwise, if the device is not in vertical mode, then the method continues to block 218. In some embodiments, the vector is a gravity vector and block 208 determines that the device is in the vertical mode when a surface of the mobile device is tilted at an angle of 50 degrees or greater relative to the gravity vector. Similarly, block 208 can determine that the device is in the horizontal mode when a surface of the mobile device is tilted at an angle less than 50 degrees relative to the gravity vector. As discussed below with reference to FIGS. 4-17, the graphical interface for the spirit level application can seamlessly transition between vertical and horizontal modes in response to an orientation of a surface of the mobile device meeting the predetermined threshold. In an embodiment, mode determination in block 208 can be based upon a first range of angles and a non-overlapping second range of angles. For example, as a degree of tilt of a surface of a mobile device is changed, the device can start in a first mode (e.g., vertical mode), then transition to the second mode (e.g., horizontal mode) at around 50 degrees, and then revert to the first mode at around 130 degrees. For instance, the device may be in vertical mode when the degree of tilt is in a first range of angles between plus or minus 50 and 130 degrees, and may be in horizontal mode when the degree of tilt is in a second range of angles that includes the remaining angles.

In block 210, a straight line is displayed. The straight line divides a bounded area into first and second areas. An angle of the line indicates an orientation of the first axis of the surface of the mobile device relative to the respective vector. An initial position of the line can be based on the orientation of a second axis of the surface of the device relative to the respective vector. For example, when the surface of the device is aligned with or parallel to the second axis, the line is positioned so that the first and second areas are equal to each other. That is, the first and second areas will each occupy an equal amount of space or volume within the bounded area when the device's surface is parallel to the second axis. Examples of the line are shown as line 1350 in FIGS. 13-17. Examples of the first and second areas are shown as areas 1310 and 1330 in FIGS. 13-17. In some embodiments where optional blocks 212 and 214 are not performed, after the line is displayed in block 210, control is passed to block 216. Otherwise, method 200 continues to block 212.

At block 212, a value is optionally displayed that indicates orientation of the surface of the mobile device relative to the respective vector. In some embodiments, the value is a number corresponding to the degrees of an angle formed by the surface and the respective vector. For example, the value can be a measure of radians or degrees of rotation needed to bring the surface of the mobile device into alignment with the vector. Example values in a vertical mode are discussed below with reference to FIGS. 13-17.

In optional block 214, the value is changed in response to a change in the orientation of the surface of the mobile device relative to the respective vector. Blocks 212 and 214 can be optionally repeated as necessary after repeating bocks 202 and 204 to determine whether the inclination has changed.

At block 216, in response to detecting a change in orientation of a second axis of the mobile device relative to the respective vector, a relative size of the first and second areas is changed in accordance with the change in orientation of the second axis relative to the vector. This block can be repeated as necessary after repeating bocks 202 and 204 to determine whether the orientation of the second axis of the device relative to the respective vector has changed. When the surface of the device is aligned with or parallel to the second axis, the first and second areas are equal to each other. That is, each area occupies an equal amount of space or volume within the bounded area. Depending on the orientation of the second axis relative to the respective vector, one of the two areas can expand and the other area can shrink. For example, as the device's surface is tilted along the second axis relative to the vector, one area shrinks while the other area expands by a corresponding amount. Examples of changes to the first and second areas at different orientations are discussed below with reference to FIGS. 13-17. After the first and second areas have been changed responsive to a change in orientation of the second axis of the device relative to the respective vector, control is passed back to block 202 where additional sensor data can be received.

At block 218, as a result of determining that the device is not in a vertical mode, the display is transitioned to a horizontal mode and first and second bounded shapes are displayed. In some embodiments, the bounded shapes have the same dimensions and area. In some embodiments, the shapes are circular. In block 218, the shapes are displayed at respective, initial positions based on the orientation of the surface of the device relative to the respective vector. Examples of bounded shapes are shown in FIGS. 4-12.

Figure 8:
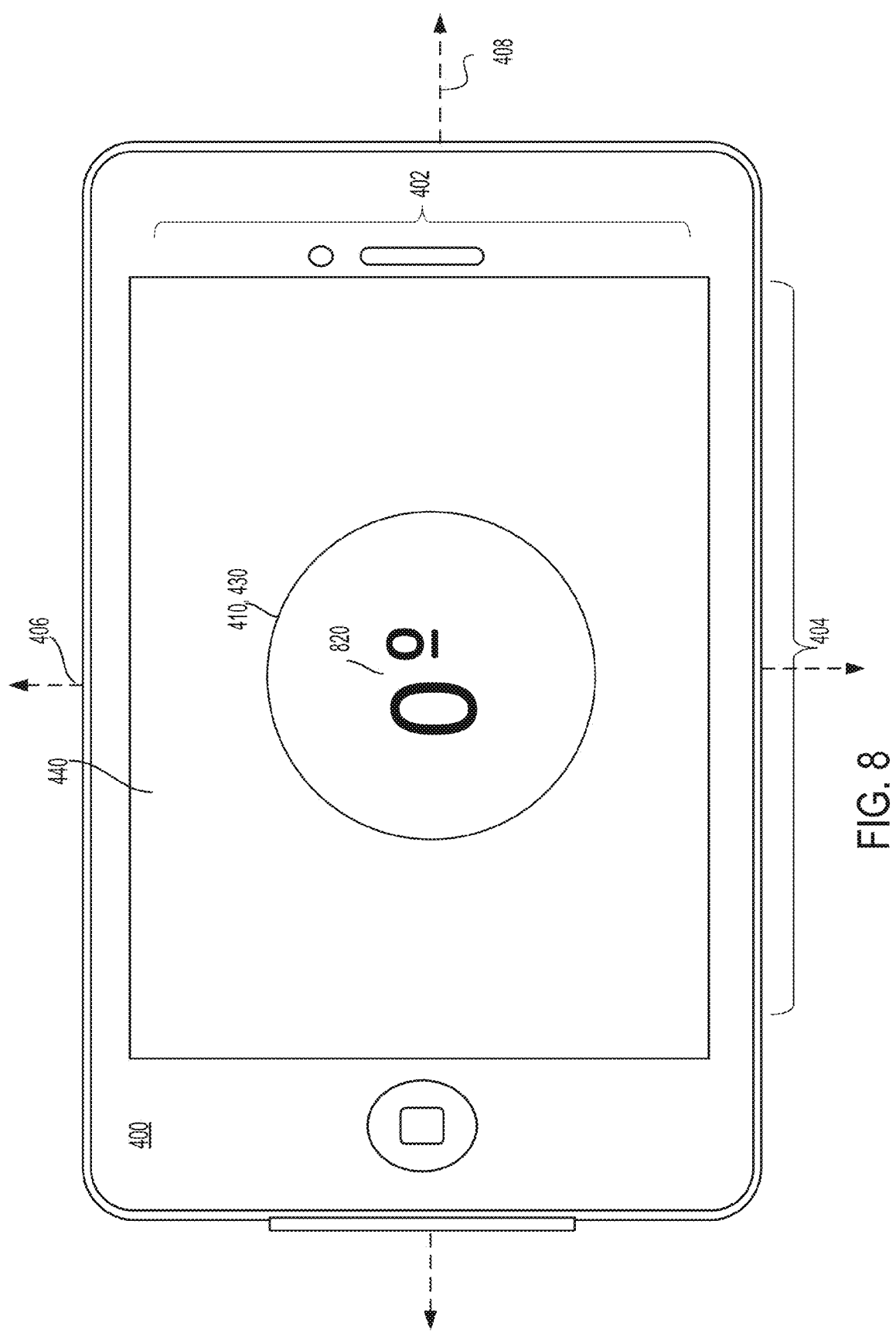
Figure 12:
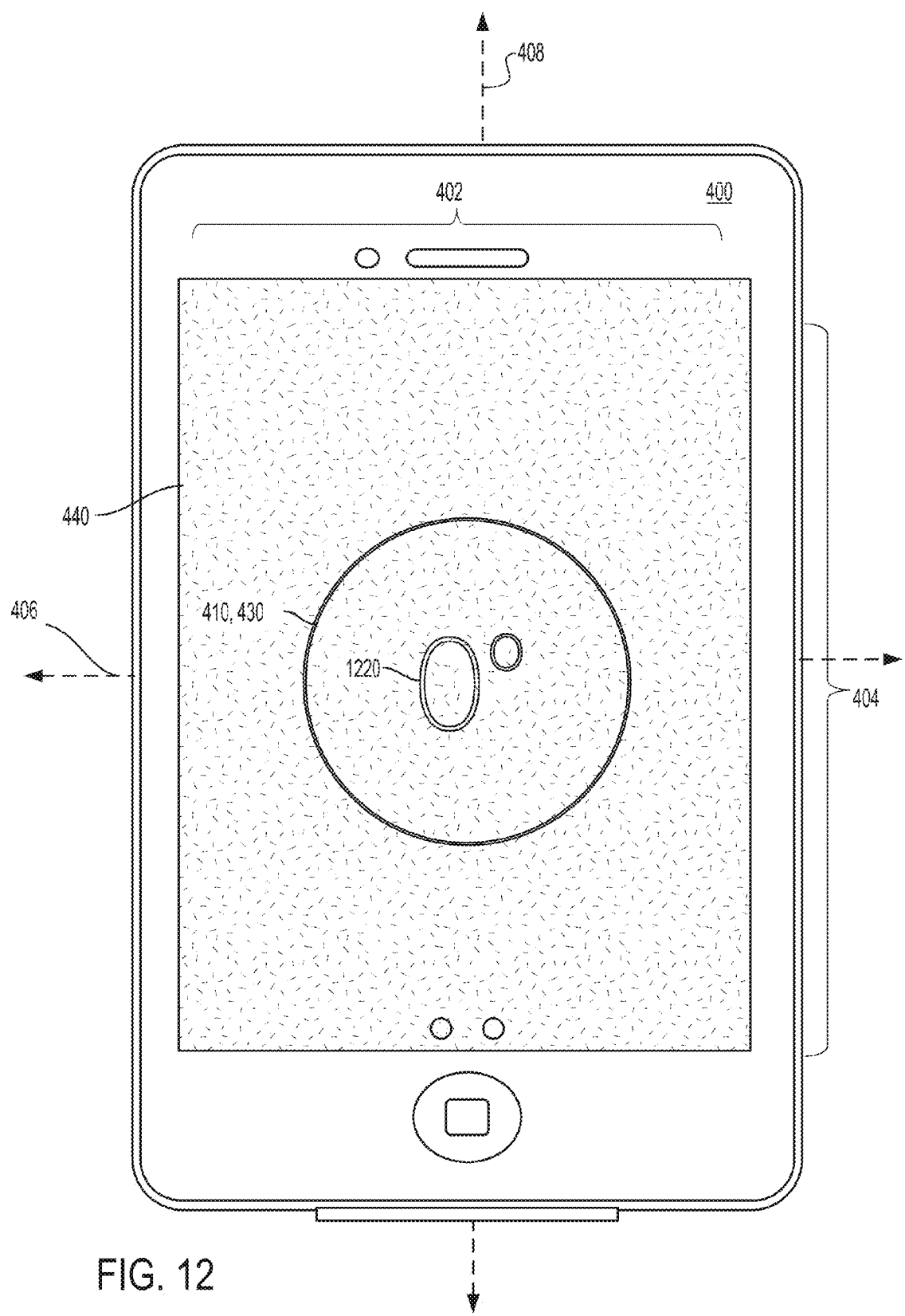

In block 220, the positions of the shapes with respect to each other are changed. The respective positions are changed along one or more axes in response to a change in orientation of the mobile device relative to the respective vector. For example, as the tilt or orientation of axes of the surface of the mobile device relative to the respective vector increases, distance between the shapes increases accordingly. Similarly, as the tilt or orientation of the axes of the surface relative to the respective vector decreases, distance between the shapes decreases and the shapes converge towards each other. In some embodiments, the positions of the shapes with respect to each other are changed relative to a first spatial axis that passes horizontally across the center of the display of the mobile device and a second spatial axis that passes vertically across the center of the display. If the surface of the mobile device is perpendicular to the respective vector, the shapes completely overlay each other. Examples of this are shown in FIGS. 8 and 12, which are discussed below. In some embodiments where optional blocks 222 and 224 are not performed, after the shapes are displayed in block 220, control is passed back to block 202 where additional sensor data is received. Otherwise, method 200 continues to block 222.

At optional block 222, a value indicating the orientation of the surface of the mobile device relative to the respective vector is displayed. According to embodiments, the value is a number corresponding to the degrees of an angle formed by an axis of the device's surface and the respective vector. For example, the value can be expressed in terms of the number of radians or degrees of rotation needed to bring the surface of the device to be perpendicular to the respective vector. Examples of the values in a horizontal mode of the interface are discussed below with reference to FIGS. 4-12.

In block 224, the value is optionally changed in response to a change in the orientation of the surface of the device relative to the respective vector. Optional blocks 222 and 224 can be repeated as necessary after repeating bocks 202 and 204 to determine whether the inclination has changed. After the value is optionally displayed and updated, control is passed back to block 202 where additional sensor data is received.

Examples of various bounded shapes are shown in FIGS. 4-12. FIGS. 4-12 depict information that may be displayed in horizontal mode and FIGS. 13-17 depict information that may be displayed in vertical mode. While the example embodiments shown in FIGS. 4-17 are illustrated using two-dimensional (2D) objects, it is to be understood that in additional embodiments three-dimensional (3D) objects can be used. For example, the device can display a 3D object whose up vector is aligned with a gravity vector. That is, the 3D object can be displayed such that it is continuously oriented to the gravity vector along both the first and second axes, not just one of the axes. In some embodiments, a 3D mathematical model is used for the object, but the object is rendered using 2D objects. For instance, for performance reasons, or due to display limitations of a mobile device, objects that are modeled in 3D can be displayed as 2D objects on the device. In one example, 2D objects are rendered so as to create the illusion of a 3D object intersecting with a display surface of the device.

Figure 3:
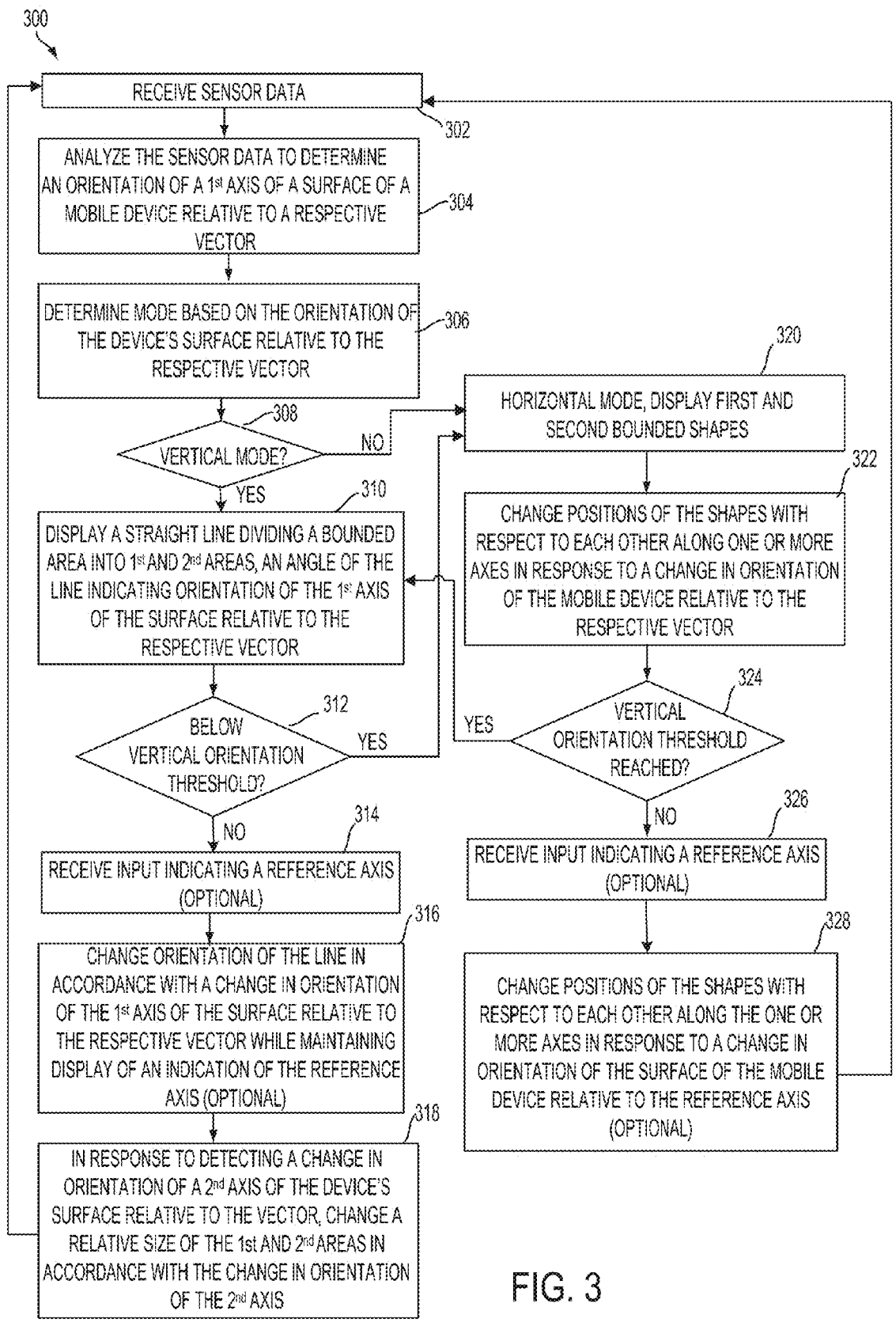

FIG. 3 is a flow diagram illustrating an example of a technique for presenting an interface indicating an orientation of axes of a surface of a mobile device relative to a respective vector, according to some embodiments of the invention. In particular, FIG. 3 is a flowchart illustrating a method 300 for presenting an interactive interface of a spirit level application indicating orientation of an axis of a surface of a mobile device relative to a respective vector. In this example, a mobile device can invoke modules of a spirit level application to carry out method 300.

In block 302, mobile device 100 receives sensor data from one or more of its sensors. As previously mentioned, the sensors can include, for example, a magnetometer, a compass, an accelerometer, a gyroscope, pressure sensors, barometers, a GPS unit and wireless circuitry integrated in the mobile device. The sensor data received from such sensors can be used in block 304 to determine an orientation of axes of the mobile device relative to a respective vector.

At block 304, the sensor data is analyzed to determine a tilt or orientation of a surface of a mobile device relative to the respective vector. In some embodiments, the surface of the mobile device is the surface of the device's display screen. According to these embodiments, the display screen can be a touch-sensitive display. By way of example, referring back to FIG. 1, the analysis can be performed by orientation analyzer module 108. In some embodiments, additional processing is performed in block 304 to detect an orientation of the mobile device relative to one or more axes. According to some embodiments of the invention, the one or more axes include a first spatial axis that passes horizontally across a center of a display of the mobile device and a second spatial axis that passes vertically across the center of the display. Referring to the example provided in FIG. 1, mobile device 100 can receive sensor data from sensors 102 at block 302 and this sensor data can be used by orientation module 106 to detect a current orientation of mobile device 100 based on the physical orientation of mobile device 100 relative to an axis passing through the center of display 112. In this way, method 300 can be used to display a device-orientation-sensitive interface for a spirit level application. Example device-orientation-sensitive interfaces are depicted in FIGS. 4-17. In particular, FIGS. 4, 6, and 9-12 depict portrait mode interfaces presented when the mobile device is in a portrait orientation, while FIGS. 5, 7, 8, and 13-17 depict landscape mode interfaces presented when the mobile device is in a landscape orientation.

In block 306, a mode for the spirit level application is determined based on the tilt or orientation determined in block 304. The tilt or orientation relative to the respective vector is used to determine that the surface of the mobile device is substantially aligned with or parallel to the vector, and is thus in a vertical mode. Similarly, the degree of tilt or orientation of the device's surface relative to the respective vector can also be used to determine that the device is in a horizontal mode. The mode can be determined in block 306 based on a predetermined, tunable threshold. For example, referring again to FIG. 1, mode determiner module 110 may determine that spirit level application 104 is in a vertical mode if display 112 is tilted at an angle greater than a predetermined number of degrees relative to the respective vector. In some embodiments of the invention, a default value for the threshold is 50 degrees.

In decision block 308, a determination is made as to whether the mobile device is in vertical mode or not. If it is determined that the device is in vertical mode, then method 300 continues to block 310. Otherwise, if the device is not in vertical mode, then the method continues to block 318. In some embodiments, block 308 determines that the device is in the vertical mode when a surface of the mobile device is tilted at an angle greater than or equal to 50 degrees relative to the respective vector. Similarly, block 308 can determine that the device is in the horizontal mode when a surface of the mobile device is tilted at an angle less than 50 degrees relative to the respective vector. As discussed below with reference to decision blocks 312 and 324 and FIGS. 4-17, the interface for the spirit level application can automatically transition between horizontal and vertical modes in response to the device's surface inclination relative to the respective vector falling below or meeting the predetermined threshold.

In block 310, a straight line dividing a bounded area into first and second areas is displayed. An angle of the line indicates the tilt or orientation of the mobile device's surface relative to the respective vector. Examples of the line are illustrated as line 1350 in FIGS. 13-17. Block 310 can be repeated to re-display the line as necessary after repeating bocks 302 and 304 to determine whether the surface's orientation relative to the respective vector has changed.

At decision block 312, a determination is made as to whether the current orientation of the mobile device's surface relative to the respective vector is below a predetermined vertical orientation threshold. This determination is made by determining the degree of tilt of the device's surface relative to the respective vector and then comparing the degree of tilt to the threshold. For example, if the vector is a gravity vector, block 312 can compare the degree of an angle formed by device's display surface and the gravity vector to a predetermined threshold. If it is determined that the surface inclination relative to the respective vector is still at or above the predetermined vertical orientation threshold, the interface remains in vertical mode. Otherwise, if the device's surface inclination relative to the respective vector is below the threshold, then method 300 continues to block 318 where the interface seamlessly transitions into the horizontal mode.

In some embodiments where the vector is the gravity vector and the predetermined vertical orientation threshold is 50 degrees, decision block 312 determines that the interface should remain in vertical mode when the device's surface remains tilted at an angle greater than or equal to 50 degrees relative to the gravity vector. Likewise, decision block 312 determines that interface should transition to the horizontal mode when it is detected that the surface of the device is tilted at an angle less than 50 degrees relative to the respective vector. According to some embodiments, as the device's surface is tilted from an angle at 50 degrees or more relative to the gravity vector to an angle less than 50 degrees, the interface of the spirit level application automatically transitions from vertical mode to horizontal mode. As discussed below with reference to decision block 324 and FIGS. 4-17, the interface for the spirit level application can automatically transition between horizontal and vertical modes in response to the device's surface inclination meeting the predetermined threshold.

In some embodiments where optional blocks 314 and 316 are not performed and decision block 312 determines that the surface is not below the predetermined vertical orientation threshold, control is passed back to block 318. Otherwise, if decision block 312 determines that the device's surface has reached or exceeded the threshold, method 300 continues to block 320 where the interface transitions into the horizontal mode.

At optional block 314, an input is received that indicates a reference axis. In some embodiments, the input is a touch input received at a touch-sensitive display of the mobile device. For example, the input can be a single-tap on the touch-sensitive display while the mobile device is parallel to the desired reference axis. In block 314, a second line can be displayed which indicates a user-selected reference axis. Example selections of reference axes in vertical mode are discussed below with reference to FIGS. 15 and 16.

In optional block 316, the orientation of the line is changed in accordance with a change in orientation of the first axis of the device's surface relative to the respective vector while maintaining display of an indication of the reference axis selected in block 314. Block 316 can be optionally repeated as necessary after repeating bocks 302 and 304 to receive additional sensor data and determine the current orientation of the first axis of the surface relative to the vector. Block 316 can also be optionally repeated after repeating optional block 314 in response to receiving additional input indicating another reference axis.

At block 318, in response to detecting a change in orientation of a second axis of the mobile device's surface relative to the respective vector, a relative size of the first and second areas is changed in accordance with the change in orientation of the second axis relative to the vector. In some embodiments, the first axis is substantially horizontal and a second axis is substantially vertical. As previously discussed with reference to block 216 shown in FIG. 2, when the device's surface is aligned with the second axis, the first and second areas are equal to each other. That is, each area occupies an equal amount of space or volume with in the bounded area when the device's surface is perpendicular to the respective vector. Depending on the tilt or orientation of the second axis of the mobile device relative to the respective vector, one of the two areas can expand and the other area can shrink. For example, as the surface is tilted relative to the second axis, the area on one side of the line shrinks while the other area expands by a corresponding amount. Examples of changes to the first and second areas at different orientations are discussed below with reference to FIGS. 13-17. After the relative sizes of the first and second areas have been changed in accordance with the change in orientation of the second axis of the device relative to the vector, method 300 returns to block 302 so that additional sensor data can be received.

In block 320, after determining that the device is not in a vertical mode, the display is transitioned to a horizontal mode and first and second bounded shapes are displayed. In some embodiments, the bounded shapes have the same dimensions and area. In some embodiments, both shapes are circles. At block 320, the shapes are displayed at respective, initial positions within the bounded area. The respective positions are based on the tilt or orientation of the device's surface relative to the respective vector. Examples of bounded shapes are shown in FIGS. 4-12.

In block 322, the positions of the shapes with respect to each other are changed. The respective positions are changed along one or more axes in response to a change in orientation of the surface of the mobile device relative to the respective vector. According to some embodiments of the invention, the positions of the shapes with respect to each other are changed relative to a first spatial axis that passes horizontally across the center of the display of the mobile device and a second spatial axis that passes vertically across the center of the display. In some embodiments, as the degree of tilt or orientation of the surface relative to the respective vector increases, distance between the shapes increases accordingly. Likewise, as the degree of tilt or orientation of the surface relative to the respective vector decreases, distance between the shapes diminishes and the shapes converge towards each other. As illustrated in FIGS. 8 and 12, if the device's surface is perpendicular to the respective vector, the shapes can be completely overlaid on top of each other.

At decision block 324, a determination is made as to whether the orientation of the device's surface relative to the respective vector has reached a predetermined vertical orientation threshold. This determination can be made by comparing the degree of tilt of the device's surface relative to the respective vector. For example, if the vector is a gravity vector, decision block 324 compares the degree of an angle formed by a surface of the device and the respective vector to the predetermined vertical orientation threshold. According to this embodiment, if the surface's orientation relative to the vector is below the predetermined vertical orientation threshold, method 300 returns to block 310 where the interface seamlessly transitions into the vertical mode (e.g., a mode including the straight line dividing the bounded area into the first and second areas). Otherwise, if the orientation of the device's surface relative to the respective vector is at or above the predetermined vertical orientation threshold, then the interface remains in horizontal mode. While blocks 308 and 324 can be used to determine the mode (e.g., vertical or horizontal) and the corresponding information displayed on the device, these blocks may not necessarily be used to determine how to orient 3D objects relative to the device's surface as described above with reference to block 218 of FIG. 2. That is, even if method 300 transitions from the horizontal mode to the vertical mode, the bounded shapes can continue to exist and be modeled in 3D space, even though the shapes may not be visible on the device's display. For example, the positions of the shapes in 3D space can be calculated and modeled even when the shapes are no longer displayed due to their position as the device is held upright. In some embodiments, there is a state change that happens between vertical and horizontal mode which changes the overlay elements (e.g., the straight line and first and second areas of the vertical mode and the bounded shapes of the horizontal mode) of the user interface, but a continuous background includes the bounded shapes which can be continue to be viewed as part of a single 3D environment.

In some embodiments where the respective vector is a gravity vector, the predetermined vertical orientation threshold is 50 degrees, decision block 324 determines that the interface should remain in horizontal mode when the device's surface remains tilted at an angle less than 50 degrees relative to the gravity vector. Similarly, decision block 324 can determine that the interface should transition to the vertical mode when the device's surface is tilted at an angle of 50 degrees or more relative to the gravity vector. According to this embodiment, as the surface of the mobile device is tilted from an angle below 50 degrees relative to the gravity vector to an angle at or above 50 degrees, control is passed to block 310 and the interface of the spirit level application transitions from horizontal mode to vertical mode. As discussed below with reference to FIGS. 4-17, the interface for the spirit level application can automatically transition between horizontal and vertical modes in response to determining that the orientation of the device's surface relative the respective vector has reached the predetermined vertical orientation threshold. According to some embodiments, as the device's surface is tilted from an angle less than the predetermined vertical orientation threshold to an angle meeting or exceeding the threshold relative to the respective vector, the interface of the spirit level application ceases to display the bounded shapes and automatically transitions from the horizontal mode to the vertical mode.

In some embodiments where optional blocks 326 and 328 are not performed and decision block 324 determines that the predetermined vertical orientation threshold has not been reached, control is passed back to block 302 where additional sensor data is received. Otherwise, if decision block 324 determines that the predetermined vertical orientation threshold has been reached, method 300 continues to block 310 where the interface is transitioned to vertical mode.

At optional block 326, an input is received that indicates a user-selected reference axis. In this block, when the input is initially received selecting the reference axis, the two shapes are displayed so that they completely overlap each other. In some embodiments, the input is a touch input received at a touch-sensitive display of the mobile device. For example, the input can be a single-tap on the touch-sensitive display while the mobile device is parallel to or aligned with the desired reference axis. Example selections of reference axes are discussed below with reference to FIGS. 15 and 16.

In optional block 328, the positions of the shapes are changed with respect to each other along the one or axes in response to a change in orientation of the surface of the mobile device relative to the reference axis. At block 328, the change in orientation is measured relative to the reference axis selected in block 326. Block 328 can be optionally repeated as necessary after repeating bocks 302 and 304 to receive sensor data and determine the orientation of the surface of the mobile device relative to the reference axis has changed. Block 328 can also be repeated after optionally repeating block 326 when additional input indicating another user-selected reference axis has been received.

FIGS. 4-17 illustrate various sample user interfaces that may be used in accordance with embodiments of the invention. In particular, FIGS. 4-17 depict device-orientation-sensitive graphical interfaces for a spirit level application on a mobile device 400. The graphical interfaces depicted in FIGS. 4-17 are described with reference to the embodiments of FIGS. 1-3. However, the graphical interfaces are not limited to those example embodiments. In some embodiments of the invention, the visual interfaces illustrated in FIGS. 4-17 are displayed on a mobile computing device, which can have a touch-sensitive (e.g., touchscreen) display device. For ease of explanation, the interfaces and operations discussed below with reference to FIGS. 4-17 are described in the context of a spirit level application executing on a mobile device 400 with a touchscreen display device. However, the operations are not intended to be limited to the exemplary device shown in FIGS. 4-17. It is to be understood that the graphical interfaces illustrated in the exemplary embodiments of FIGS. 4-17 can be readily adapted to be rendered on displays of a variety of computing device platforms running a variety of operating systems.

Throughout FIGS. 4-17, graphical user interfaces are shown with various bounded areas, bounded shapes, lines, values, user-selected reference axes, and interactive elements that are used to convey orientation of a device's axes relative to a respective vector, indicate angles between a surface of a mobile device the respective vector, indicate user-selected reference axes, or invoke other functionality. The interfaces are configured to use sensor data to display states of a mobile device including, but not limited to, orientation of an axis of the mobile device relative to a respective vector, a value corresponding to an angle formed by the device's surface and the respective vector, a number of radians or degrees of rotation needed to bring the device's surface into alignment with the vector, orientation of one or more axes of the device's surface relative to the vector, the surface's perpendicularity to a gravity vector (e.g., a level state), and the surface's alignment with the gravity vector (e.g., a plumb state). The interfaces are configured to accept input for selecting one or more reference axes. The input can be touch inputs, such as single-tap inputs or gestures. For brevity, only the differences occurring within the figures, as compared to previous or subsequent ones of the figures, are described below.

FIGS. 4-12 illustrate displays of a spirit level application interface in a horizontal mode. As seen in FIGS. 4-12, in the horizontal mode, the spirit level application displays two bounded shapes that can be lined up to indicate that the mobile device is perpendicular to a gravity vector (e.g., level). In this way, the spirit level application can be used to determine if a surface that the mobile device is placed on is level. FIGS. 4-8 illustrate displays of mobile device 400 when it has been placed on a surface. In particular, FIGS. 4-8 show displays in a horizontal mode of an interface of the spirit level application when the display of a mobile device 400 is facing away from a force. FIGS. 9-12 show displays in the horizontal mode of the interface when the display of mobile device 400 is facing towards the force. In some embodiments, the force is gravity.

Figure 9:
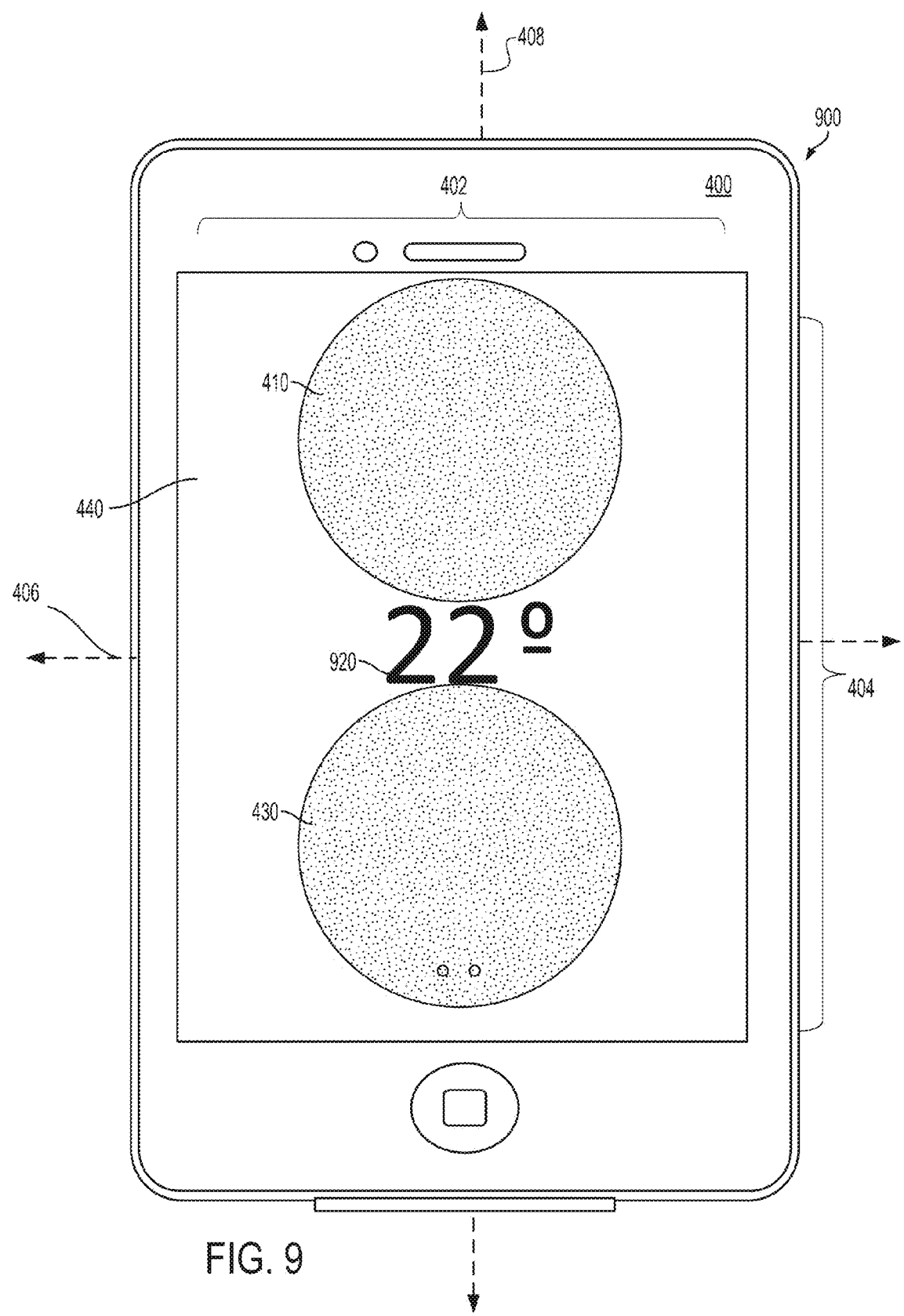
Figure 10:
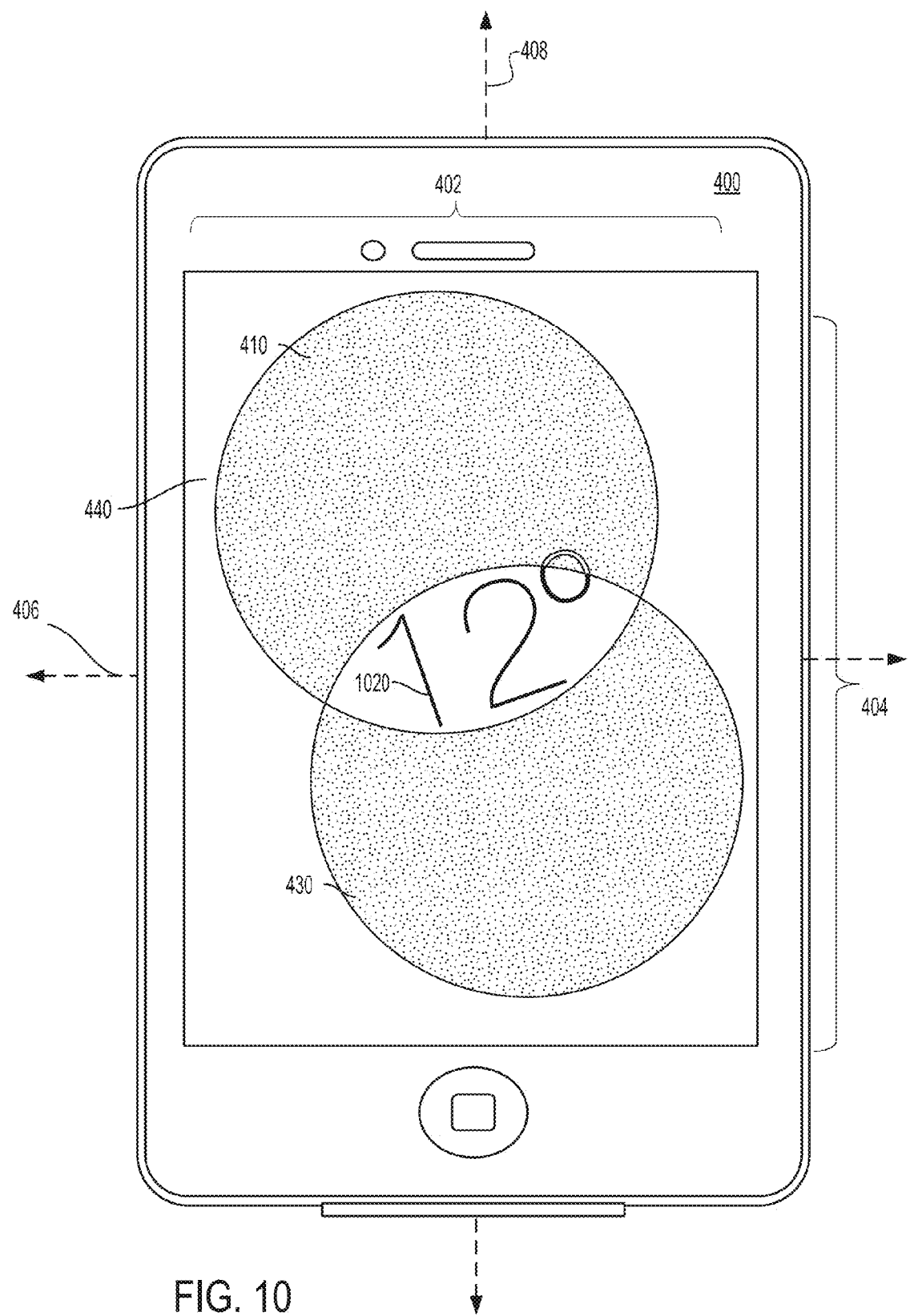
Figure 11:
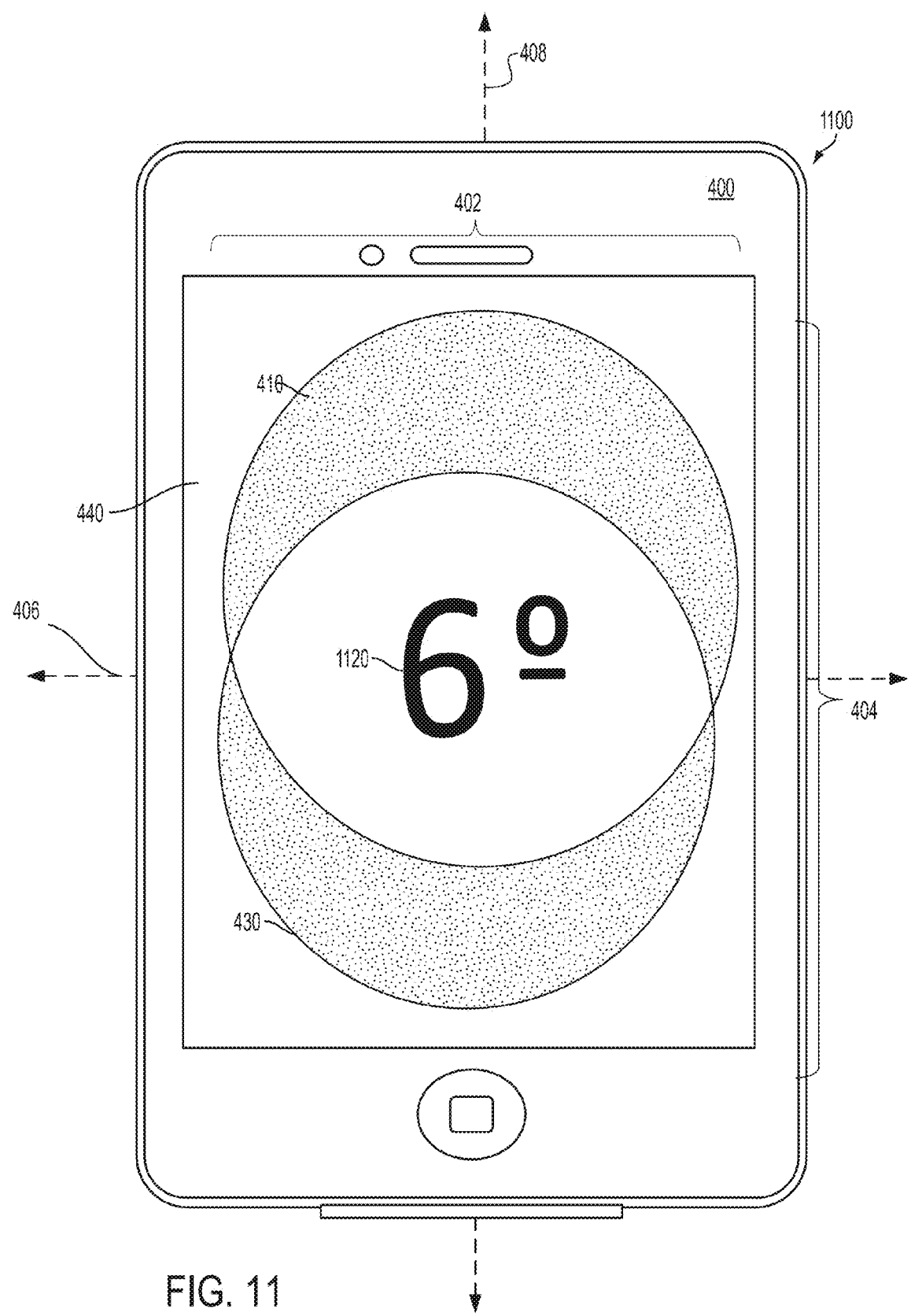

For example, if device 400 is rotated about a fixed point with its display faced toward the fixed point, device 400 is first displayed in a horizontal mode where two bounded shapes 410 and 430 of a first color (e.g., white) are displayed on a background of a second color (e.g., black) in a bounded area 440, then the bounded shapes 410 and 430 of the first color (e.g., white) move out of bounded area 440 and bounded area 440 has a background of the second color (e.g., black). Continuing this example, as the rotation of device 400 about the fixed point continues, an area of the first color (e.g., white) starts to be displayed in bounded area 440 and continues increasing in size while an area of the second color (e.g., black) decreases in size until bounded area 440 has a background of the first color (e.g., white). Continuing this example, as the rotation of device 400 about the fixed point continues, two bounded shapes 410 and 430 of the second color (e.g., black) move into bounded area 440 that has a background of the first color (e.g., white), and the bounded shapes 410 and 430 move closer together as the rotation of device 400 about the fixed point continues. Examples of this are illustrated in FIGS. 9-11. Continuing this example, as the rotation of mobile device 400 about the fixed point continues, the bounded shapes 410 and 430 of the second color (e.g., black) move out of bounded area 440 and bounded area 440 is still displayed filled in with the first color (e.g., white). Continuing this example, as the rotation of device 400 about the fixed point continues, an area of the second color (e.g., black) starts to be displayed in bounded area 440 and continues increasing in size while an area of the first color (e.g., white) decreases in size until bounded area 440 has a background of the second color (e.g., black). In this example, bounded area 440 is able to smoothly transition between the vertical mode and the horizontal mode by inverting the colors of the horizontal mode when the display is facing one direction (e.g., up) as compared to when the display is facing an opposite direction (e.g., down).

Figure 4:
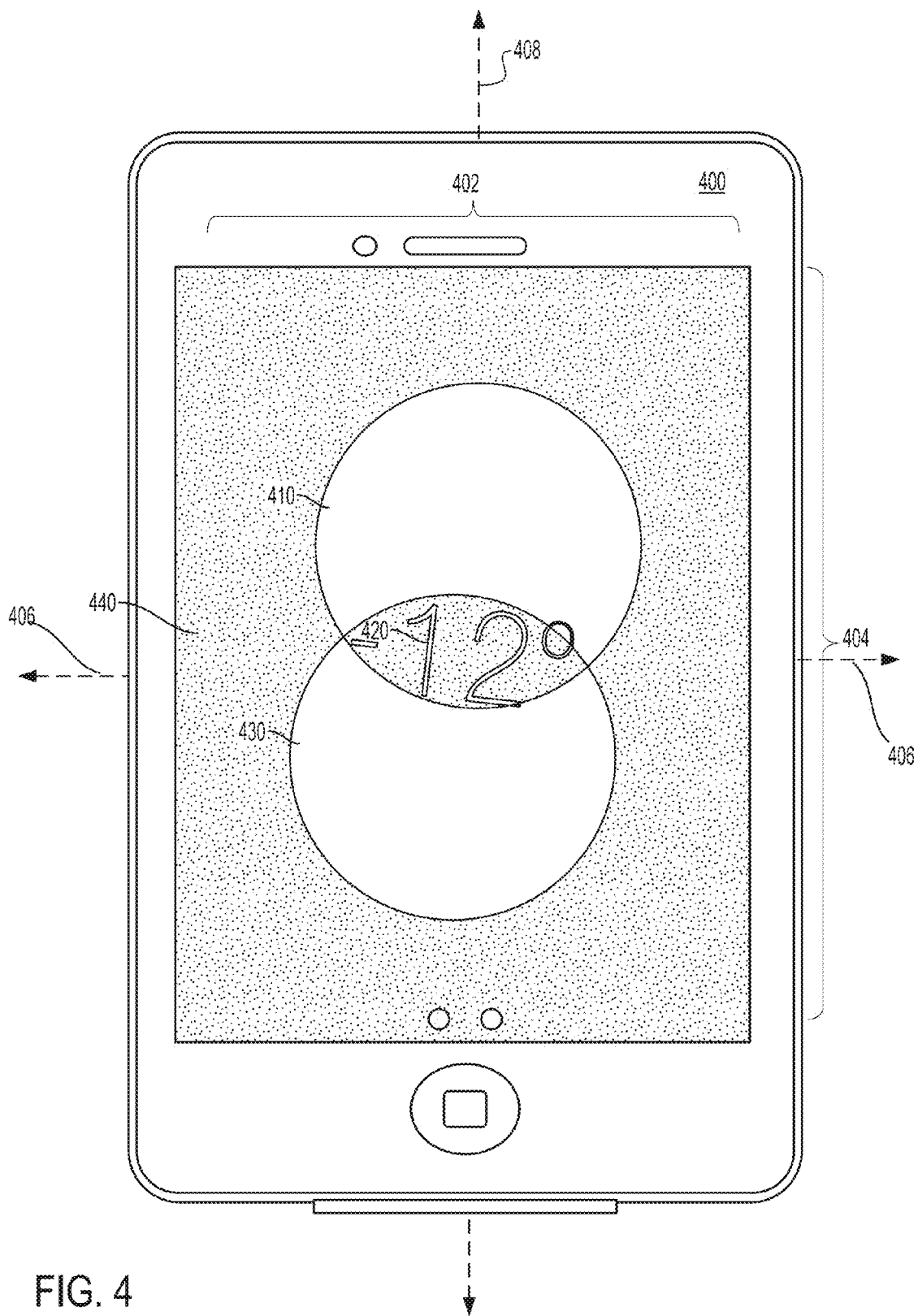
FIGS. 4-17 illustrate various sample user interfaces that may be used in accordance with embodiments of the invention.

FIG. 4 shows an exemplary horizontal mode interface of a spirit level application executing on a mobile device 400. Mobile device 400 can be a smart phone such as an Apple iPhone®, for example. The interface includes a bounded area 440 with a first bounded shape 410 and a second bounded shape 430. While in the non-limiting example of FIG. 4, shapes 410 and 430 are equally sized circles, it is to be understood that in additional embodiments, other shapes can be used. As shown in FIG. 4, mobile device 400 can operate in a horizontal mode in which physical tilting of device 400 along a physical spatial axis 408 that passes vertically across the center of bounded area 440 along length 404 causes the device to render the shapes 410 and 430 at a different positions with respect to each other along axis 408. Such tilting of mobile device 400 so as to change an angle between axis 408 and a respective vector causes the device to display shapes 410 and 430 at different positions along axis 408. The distance between shapes 410 and 430 along axis 408 is proportional to the angle between axis 408 and the respective vector. That is, as the angle increases, the distance between shapes 410 and 430 increases proportionally. Similarly, as the angle decreases, the distance between shapes 410 and 430 proportionally decreases. In some embodiments, the respective vector a gravity vector detected using one or more sensors of mobile device 400.

FIG. 4 also shows how tilting of device 400 along another physical spatial axis 406 that passes horizontally across the center of bounded area 440 along width 402 causes the device to display shapes 410 and 430 at different, offset positions along axis 406. That is, tilting of mobile device 400 that changes an angle between the respective vector and axis 406 causes the device to display shapes 410 and 430 at different positions along axis 406. The distance between shapes 410 and 430 along axis 406 is proportional to the angle between axis 406 and the respective vector.

According to embodiments, shapes 410 and 430 have the same color and shading so that they contrast with the color and shading of bounded area 440. In some embodiments, when the surface of the display of device 400 is facing away from a force, shapes 410 and 430 are white and bounded area 440 is black, and when the display surface is facing towards the force, shapes 410 and 430 are black and bounded area 440 is white. In one such embodiment, the force is gravity.

FIG. 4 also shows that a value 420 can be displayed near the center of the bounded area. Value 420 is displayed as a numeric value corresponding to the degrees of rotation needed to bring the surface of mobile device 400 into alignment with the respective vector. In the example of FIG. 4, value 420 indicates that mobile device 400 is tilted −12 degrees relative to the respective vector. In alternative embodiments, shapes 410 and 430 are used to indicate the tilt or orientation of mobile device 400 relative to the vector without displaying value 420. In the example embodiments provided in FIGS. 4-7, values 420, 520, 620 and 720 shown in FIGS. 4-7 are negative to indicate that the display of device 400 is opposite of a force (e.g., facing away from gravity). As illustrated in FIGS. 4-7, the orientation of values 420, 520, 620 and 720 can change to indicate an orientation of the surface of the mobile device relative to the respective vector.

Mobile device 400 can use sensor data to detect its current physical orientation relative to axes 406 and 408. In the example of FIG. 4, a device-orientation-sensitive interface for a spirit level application has detected that mobile device 400 is in a portrait orientation relative to axis 406, and the interface is rendered in portrait mode. Additional examples of device-orientation-sensitive interfaces are provided in FIGS. 5-17. For example, FIGS. 6 and 9-12 illustrate portrait mode interfaces displayed responsive to determining that a mobile device 400 is in a portrait orientation relative to axis 406, and FIGS. 5, 7 and 8 depict landscape mode interfaces displayed in response to determining that mobile device 400 is in a landscape orientation relative to axis 408.

Figure 5:
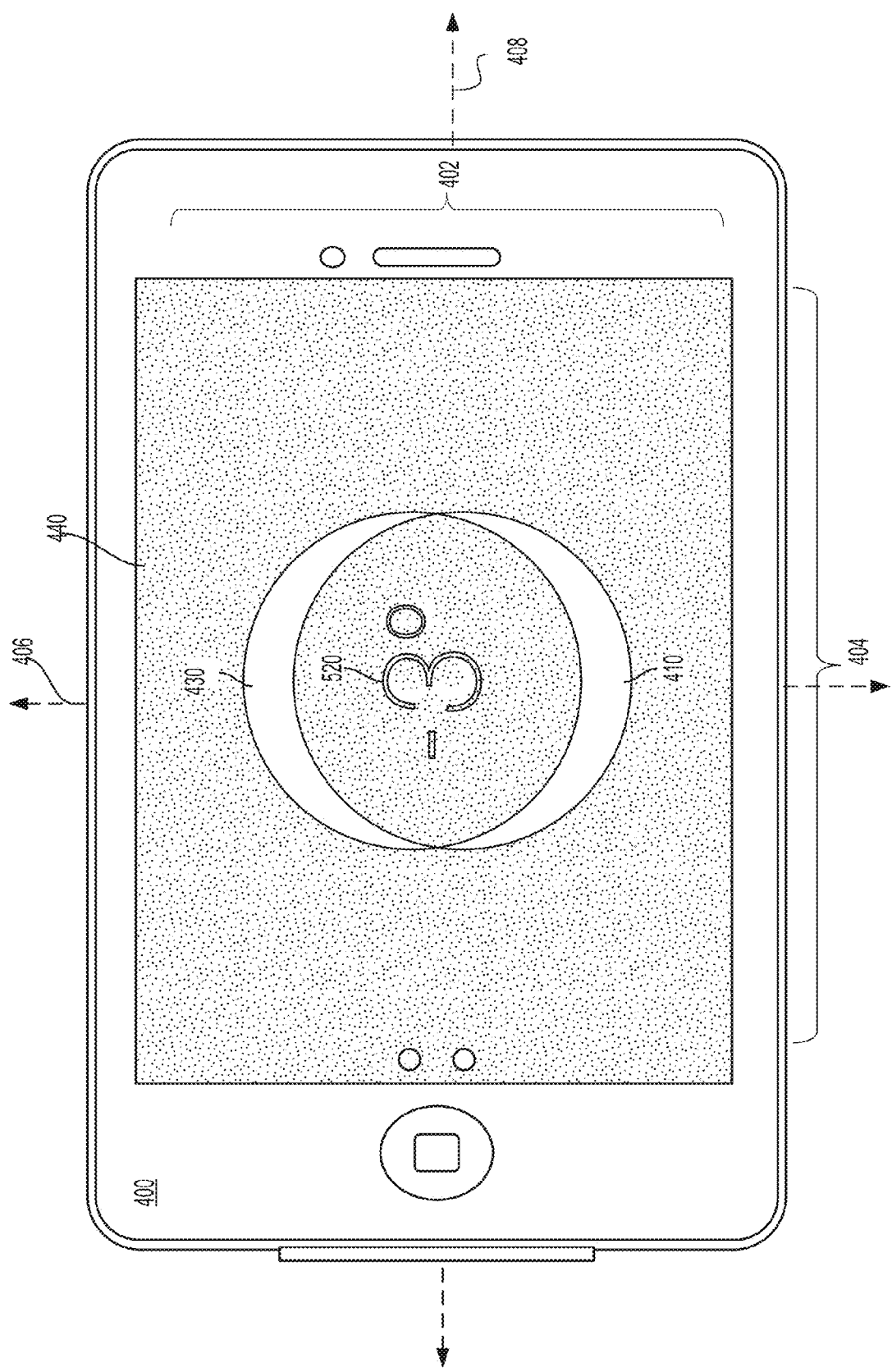

FIG. 5 shows an exemplary horizontal mode interface of the spirit level application when mobile device 400 is in a landscape orientation relative to axis 408. FIG. 5 also shows how tilting of device 400 along spatial axes 406 and 408 has caused device 400 to display shapes 410 and 430 closer together as compared to FIG. 4. Similarly, value 520 shown in FIG. 5 has decreased to −3 degrees to indicate that device 400 is now tilted −3 degrees relative to the respective vector as compared to the −12 degree tilt shown in FIG. 4.

Figure 6:
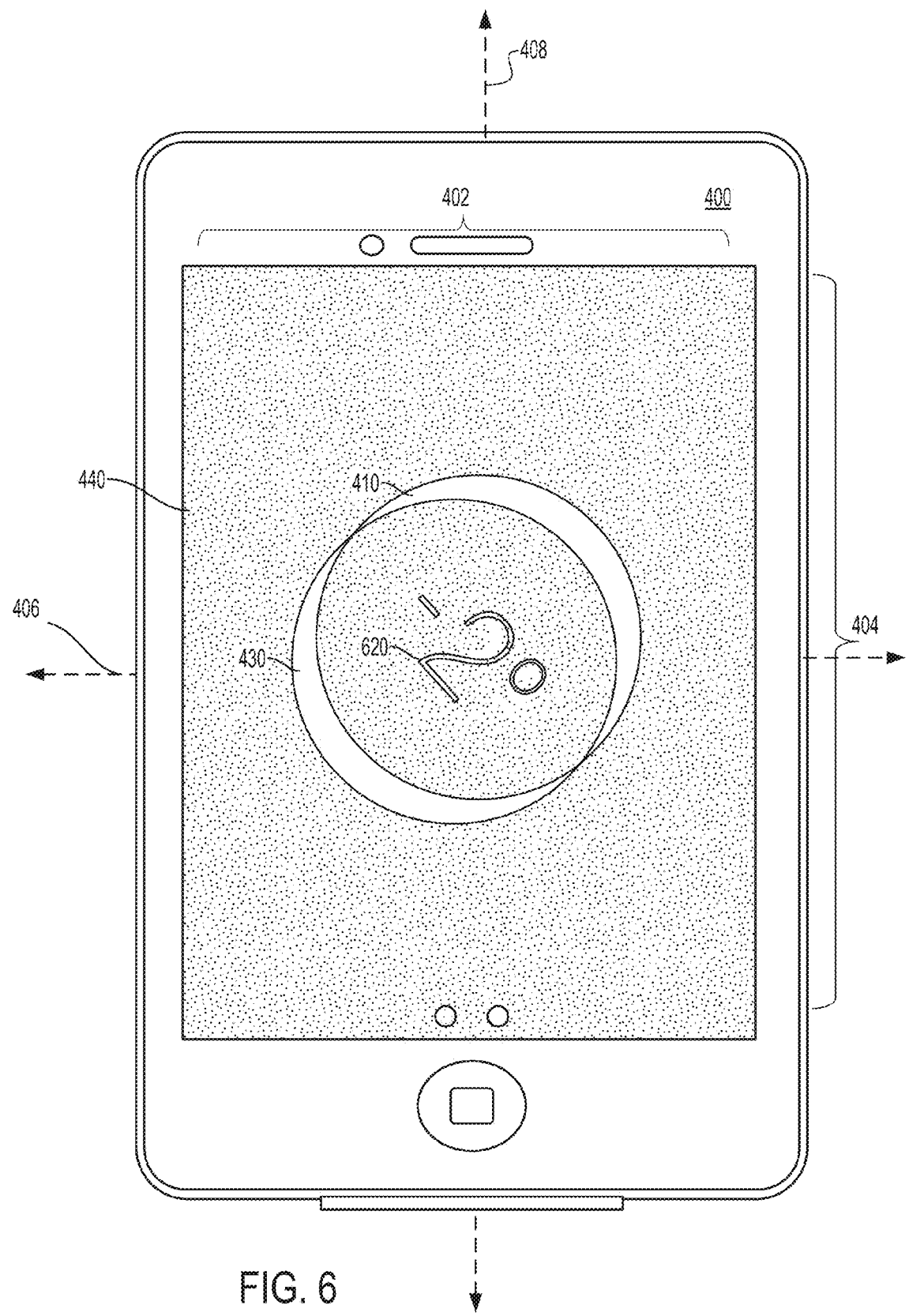

FIG. 6 shows a display in the horizontal mode interface of the spirit level application when mobile device 400 has been rotated to be back in the portrait orientation relative to axis 406. As shown in FIG. 6, additional tilting of device 400 along spatial axes 406 and 408 has caused device 400 to display shapes 410 and 430 even closer together as compared to FIG. 5. Likewise, value 620 shown in FIG. 6 has decreased to −2 degrees to indicate that device 400 is now tilted −2 degrees relative to the respective vector as compared to the −3 degree tilt shown in FIG. 5.

Figure 7:
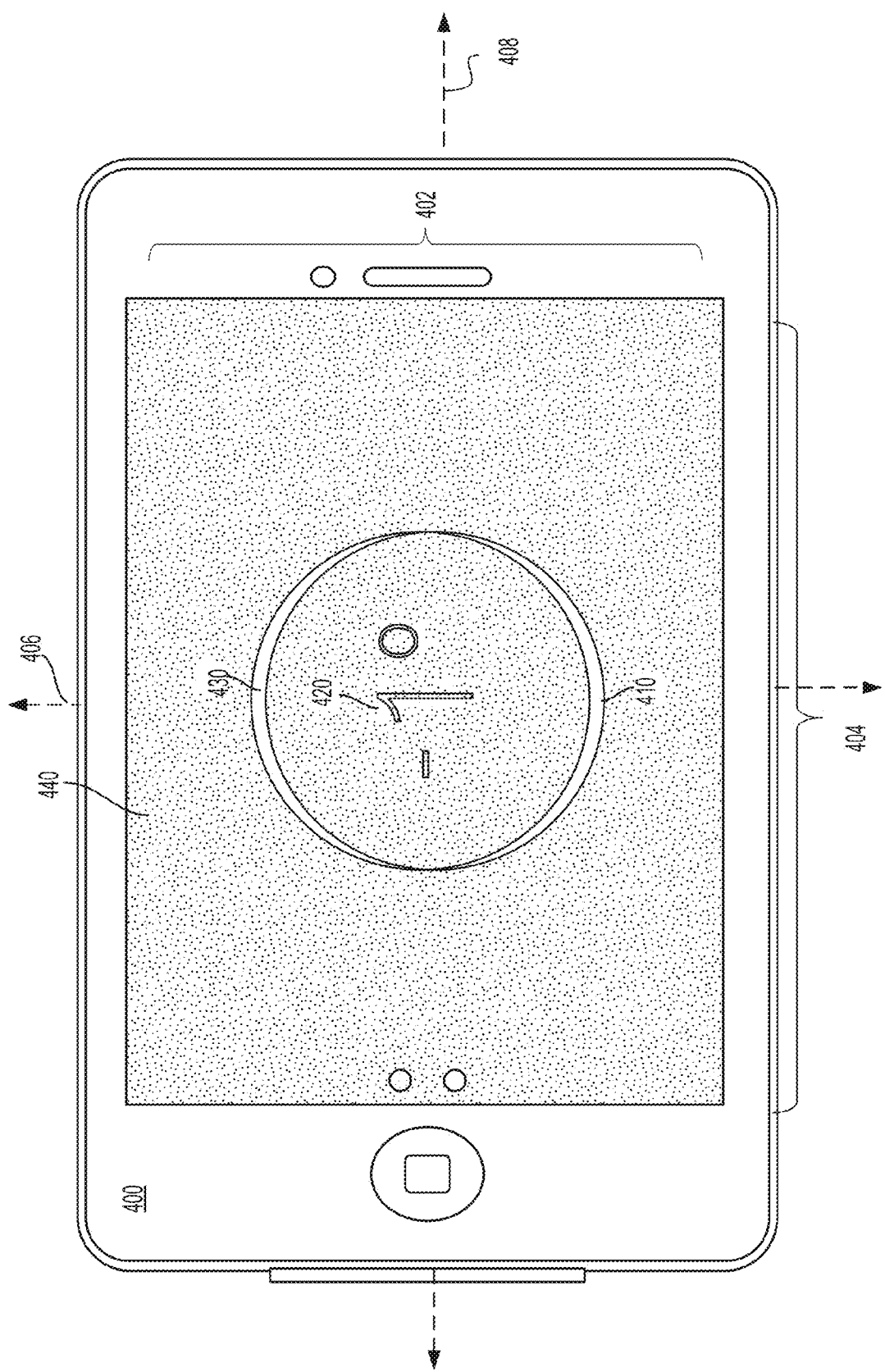

FIG. 7 shows another example horizontal mode interface of the spirit level application when mobile device 400 has been rotated back to the landscape orientation relative to axis 408. As depicted in FIG. 7, a relatively minor amount of additional tilting of device 400 along spatial axes 406 and 408 has caused device 400 to display shapes 410 and 430 so that they almost completely overlap with each other. Value 720 in FIG. 7 has decreased to −1 degrees to indicate that device 400 is now tilted only −1 degree relative to the vector as compared to the −2 degree orientation shown in FIG. 6.

FIG. 8 shows a horizontal mode interface of the spirit level application when mobile device 400 is perpendicular to the respective vector. As shown in FIG. 8, when value 820 is zero degrees, shapes 410 and 430 are completely overlaid and the color of bounded area 440 changes to indicate that mobile device 400 is perpendicular to the vector. In one example, the color of bounded area 440 changes to green when the display surface of mobile device 400 is perpendicular to the vector.

FIGS. 9-12 show horizontal mode interfaces of the spirit level application when the display of mobile device 400 is facing a force. In some embodiments, the force is gravity. For example, FIGS. 9-12 can represent the horizontal mode displays rendered by the spirit level application when mobile device 400 is placed flat against a ceiling, the underside of a shelf, the underside of a desk, or another surface facing gravity. As shown in FIGS. 9-12, the shading and coloration of bounded area 440 and shapes 410 and 430 differs from those used in FIGS. 4-8 to visually indicate that the display of mobile device 400 is now facing towards the force instead of facing away from the force. In the examples embodiments provided in FIGS. 9-11, values 920, 1020, and 1120 are positive to indicate that the display of device 400 is facing the force (e.g., facing towards gravity).

FIG. 9 shows a display in the horizontal mode interface of the spirit level application when mobile device 400 is physically in the portrait orientation relative to axis 406. As shown in FIG. 9, mobile device 400 is displaying shapes 410 and 430 apart along spatial axis 408 by a distance corresponding to the tilt of axes 406 and 408 of device 400 relative to the respective vector. Value 920 shown in FIG. 9 is 22 degrees to indicate that device 400 is tilted 22 degrees relative to the vector.

FIG. 10 shows another display in the horizontal mode interface of the spirit level application when mobile device 400 has been tilted along spatial axes 406 and 408 so that shapes 410 and 430 are displayed closer together as compared to FIG. 9. Likewise, value 1020 shown in FIG. 10 has decreased to 12 degrees to indicate that a surface of device 400 is now tilted 12 degrees relative to the vector as compared to the 22-degree tilt shown in FIG. 9. FIG. 10 also shows how, in addition to repositioning bounded shapes 410 and 430 along axis 408 so that they partially overlap with each other, the positions of shapes 410 and 430 have changed relative to axis 406 as compared to FIG. 9. This is a visual indication that the surface of device 400 has been tilted along both axis 406 and axis 408 relative to the vector.

FIG. 11 illustrates another display in the horizontal mode interface of the spirit level application when mobile device 400 has been tilted along spatial axes 406 and 408 so that bounded shapes 410 and 430 are displayed to overlap more with each other as compared to FIG. 10. Similarly, value 1120 shown in FIG. 11 has decreased to 6 degrees to indicate that device 400 is now tilted only 6 degrees relative to the vector as compared to the 12-degree tilt shown in FIG. 10.

FIG. 12 shows a portrait orientation of the horizontal mode of the spirit level application when mobile device 400 is perpendicular to the vector. In the example of FIG. 12, value 1220 is zero degrees, and bounded shapes 410 and 430 overlay each other. According to embodiments, the shading, brightness and/or color of bounded area 440 and/or of value 1220 can change to indicate that a surface of mobile device 400 is perpendicular to the vector. As seen in FIG. 12, when a surface of mobile device 400 is perpendicular to the vector, value 1220 is zero degrees and the color of bounded area 440 changes. In one example, the color of bounded area 440 changes to green when the display surface of mobile device 400 is perpendicular to the vector. In some embodiments, the spirit level application can use sound, such as, for example, a chime, to indicate that mobile device 400 is perpendicular to the vector.

In some embodiments, there are behaviors that affect the display of values 420, 520, 620, 720, 820, 920, 1020, 1120, and 1220 shown in FIGS. 4-12 as well as the motion of the shapes 410 and 430 when the values approach zero. According to embodiments, while the values themselves represent reality (e.g., the actual degrees of rotation needed to bring the surface of mobile device 400 into alignment with the respective vector), as a numeric value approaches zero, there is a definable 'dead zone' or range of values in which shapes 410 and 430 are overlaid and the color of bounded area 440 is changed. For example, the color of bounded area 440 can be changed to green as the device's surface approaches alignment with the respective vector. Also, for example, the visual motion of shapes 410 and 430 can be scaled on a curve so as to reduce their motion as the numeric value approaches zero. The visual indications of alignment with the respective vector in the horizontal mode shown in FIGS. 8 and 12 can have a certain amount of 'stickiness' as values 820 and 1220 approach zero. For instance, in cases where the respective vector is a gravity vector, when the device's display surface tilted to be nearly perpendicular to the gravity vector (e.g., level), an embodiment can visually snap value 820 directly to zero in order to reduce visible noise in the user interface. In one such embodiment, this can be done when the value is within a quarter of a degree of zero (e.g., in the range of −0.25 to 0.25 degrees). In some embodiments, after value 820 has been snapped to zero, the device will not escape the sticky state until the device's surface is tilted by a set amount. For the example, shapes 410 and 430 may continue to be overlaid until the surface of the device is tilted to be more than a quarter of a degree out of alignment with the respective vector. Embodiments smooth the values on both sides of zero (positive and negative) so that a relatively small amount of ramping of the values as they approach zero is invisible to a user of the device. For example, hysteresis can be used to avoid rapid ramping of the values when they are approaching zero and to avoid rapid fluctuations or switching of the color of bounded area 440. Such hysteresis can be added to the user interface so that the sticky state lags behind the tilting of the device when the values approach zero.

In the embodiments depicted in FIGS. 4-12, the respective vector can be a default vector, such as, for example, a gravity vector. As previously discussed with reference to block 326 shown in FIG. 3, in some embodiments, a reference axis can be selected. According to one such embodiment, the reference axis can be selected when an input is received at mobile device 400 while the device is tilted to be aligned with or parallel to the desired reference axis. For example, a touch input such as a single-tap can be received within bounded area 440 while the display surface of device 400 is coincident with a desired reference axis. In this way, a user can select a new, non-default reference axis, and the interface of the spirit level application will change the positions of bounded shapes 410 and 430 with respect to each other along one or more of axes 406 and 408 in response to a change in orientation of the display surface of mobile device 400 relative to the reference axis. In some embodiments where a value such as value 420 is displayed, in response to receiving input indicating a reference axis, the value is changed to indicate the degrees of rotation needed to bring the surface of mobile device 400 into alignment with the reference axis. After receiving input indicating the user-defined reference axis and detecting a change in orientation of the surface of device 400 relative to the respective vector, value 420 can be displayed to indicate the orientation of the user-defined reference axis of device 400 relative to the respective vector. According to this embodiment, the orientation of value 420 can also change to indicate an orientation of the surface of device 400 relative to the respective vector. According to some embodiments, if no reference axis is selected, the respective vector defaults to a gravity vector, first axis (e.g., axis 406 in FIG. 4) is substantially horizontal and a second axis (e.g., axis 408 in FIG. 4) is substantially vertical.

Figure 15:
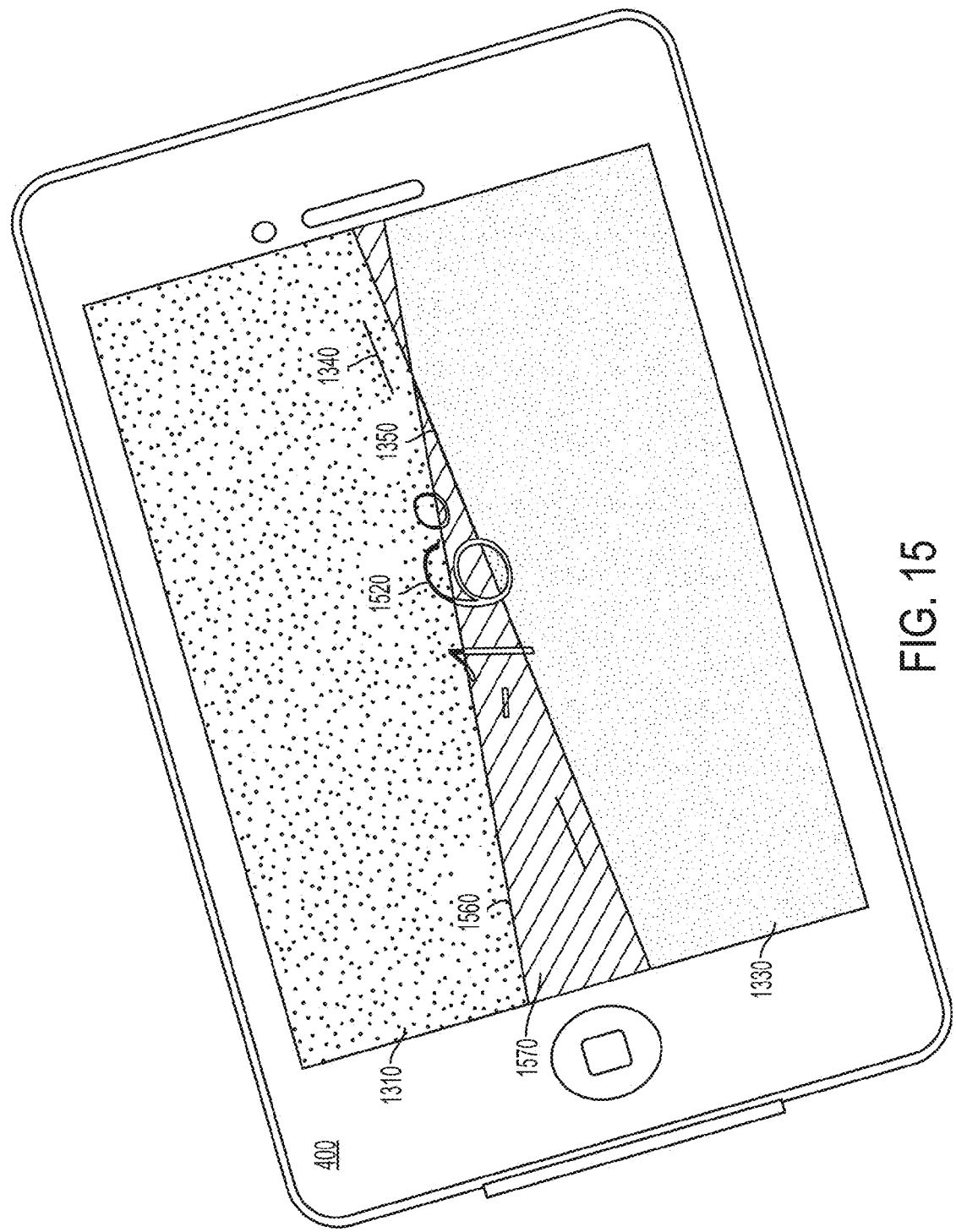
Figure 16:
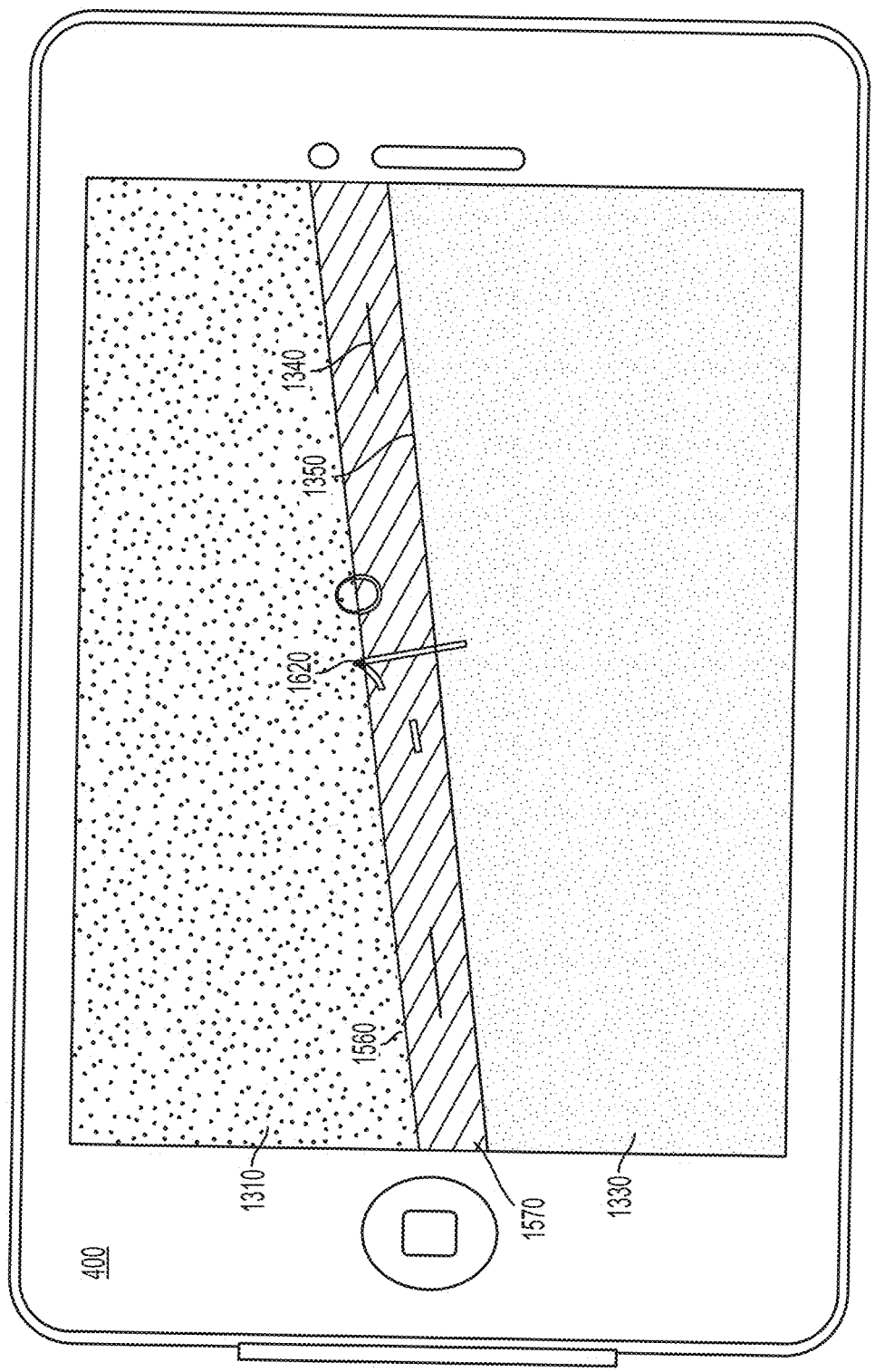

In some embodiments, a gesture (e.g., a single tap input by a user) defines a first user-defined reference axis and a second user-defined reference axis and a difference between the orientation of the device. In some embodiments, a difference between the device orientation and the first user-defined reference axis is shown by an angle between a second line (e.g., line 1560 in FIGS. 15 and 16) that represents the user-defined reference axes and a first line (e.g., line 1350 in FIGS. 15 and 16) that represents an orientation of device 400 relative to gravity, a difference between the device orientation and the second user-defined reference axis is shown by an amount of area (e.g., area 1570 in FIGS. 15 and 16) between the second line that represents the user-defined reference axes and the first line that represents an orientation of device 400 relative to gravity (e.g., as shown in FIGS. 15 and 16).

According to some embodiments, in response to determining that the orientation of the surface of device 400 relative to the respective vector has reached a predetermined threshold, the horizontal mode interface shown in FIGS. 4-12 is automatically transitioned to a second, vertical mode shown in FIGS. 13-17. With reference to the example embodiments of FIGS. 5 and 13, the transitioning can include displaying a straight line 1350 dividing bounded area 440 into a first area 1310 and a second area 1330, wherein an angle of line 1350 indicates an orientation of a first axis 408 of the surface of device 400 relative to the respective vector. The transitioning can also include maintaining the angle of line 1350 at a first angle, and in response to detecting a change in orientation of the second axis 406 of device 400 relative to the respective vector, changing a relative size of the first and second areas 1310 and 1330 in accordance with the change in orientation of the second axis 406 of device 400 relative to the respective vector. In some embodiments, the transitioning further comprises in response to detecting a first change in orientation of the surface of device 400, increasing a distance between first bounded shape 410 and second bounded shape 430, and, after increasing the distance between the first bounded shape 410 and the second bounded shape 430. The transitioning can also include, in response to detecting the second change in orientation of the surface of device 400, ceasing to display the first bounded shape 410 and the second bounded shape 430, and after ceasing to display the first bounded shape 410 and the second bounded shape 430, detecting a third change in orientation of the surface of device 400 in the first direction. Next, in response to detecting the third change in orientation of the surface of device 400, the transitioning can include displaying at least a portion of the first area 1310 within the bounded area 440 and displaying at least a portion of the second area 1330 within the bounded area 440.

FIGS. 13-17 illustrate displays of a vertical mode interface of the spirit level application when mobile device 400 is in a physical landscape orientation. As previously discussed with reference to block 322 shown in FIG. 3, the spirit level application on device 400 can transition from the horizontal mode illustrated in FIGS. 4-12 to the vertical mode illustrated in FIGS. 13-17 in response to determining that a predetermined vertical orientation threshold has been reached. Similarly, as discussed above with reference to decision block 312 of FIG. 3, the spirit level application can automatically transition from the vertical mode illustrated in FIGS. 13-17 to the horizontal mode illustrated in FIGS. 4-12 in response to determining that device 400 is below the predetermined vertical orientation threshold. In FIGS. 13-17, a straight line 1350 indicates the current tilt or orientation of device 400 relative to a respective vector indicated by hash marks 1340. In this way, line 1350 indicates the orientation of an edge of device 400 relative to the respective vector. In some embodiments, the vector is a gravity vector and the first axis indicated by hash marks 1340 is horizontal by default. In the embodiments shown in FIGS. 13-17, vertical mode displays are rendered in landscape orientations when a lengthwise edge of device 400 is facing a force. According to one such embodiment, the force is gravity. In one example, the displays of FIGS. 13-17 can be rendered when device 400 is placed on a surface so that the device is on its side. As previously discussed, orientation module 106 can detect when mobile device 400 has been rotated to a portrait orientation so that the vertical mode interface is a device-orientation-sensitive interface. That is, any of vertical mode displays illustrated in FIGS. 13-17 can be presented in portrait mode when device 400 is rotated into a portrait orientation relative to a force such as gravity.

Figure 13:
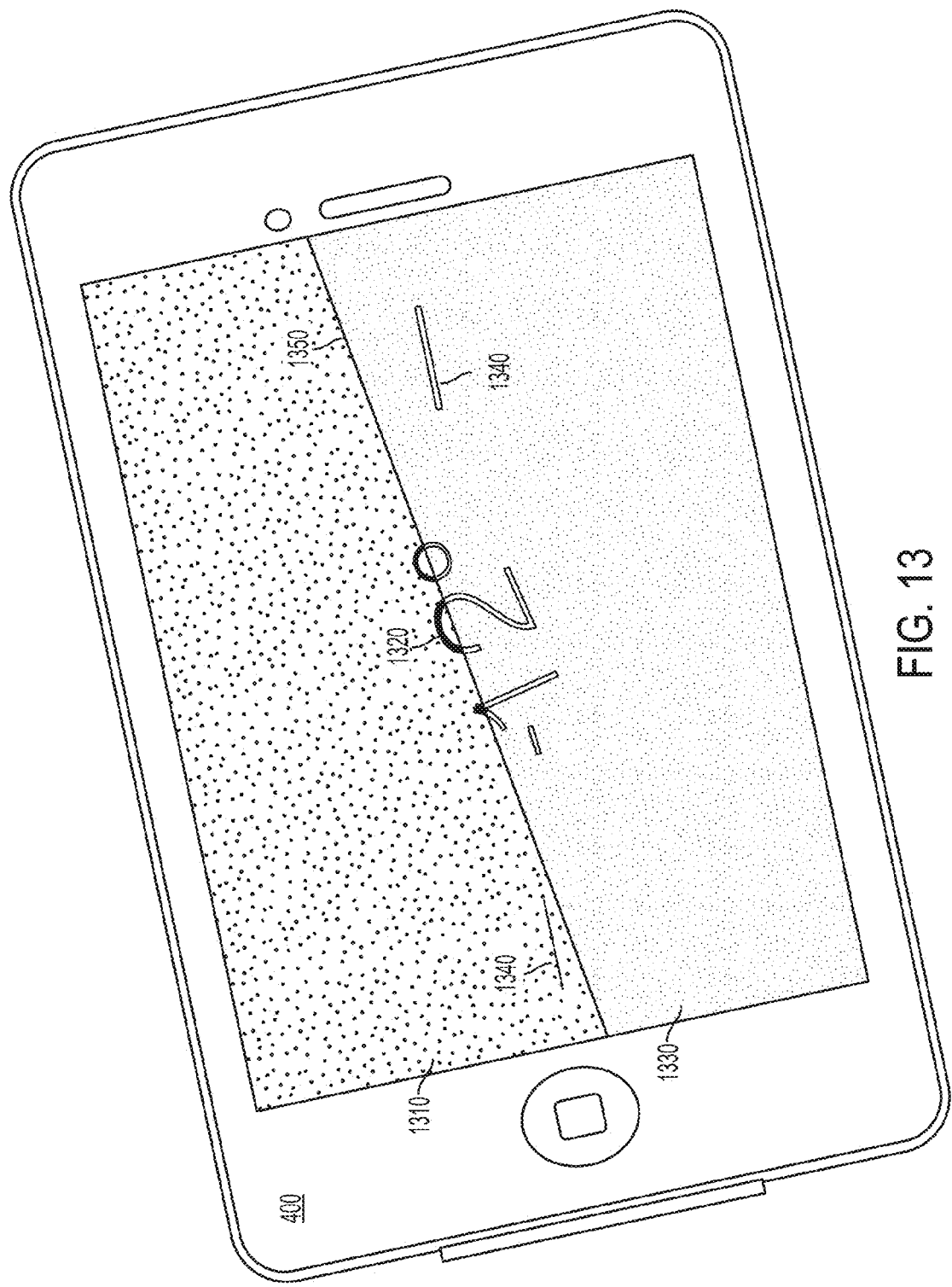

FIG. 13 shows how line 1350 divides the display into two areas, area 1310 and area 1330. As shown, line 1350 separates areas 1310 and 1330, the angle of line 1350 indicates orientation of an edge of mobile device 400 relative to the respective vector. FIG. 13 depicts display of straight line 1350 dividing a bounded area into a first area 1310 and a second area 1330, wherein an angle of line 1350 indicates an orientation of a first axis of a surface of mobile device 400 relative to a respective vector. FIG. 13 also illustrates how device 400, while maintaining the angle of line 1350 at a first angle, can detect a change in orientation of a second axis of device 400 relative to the respective vector, and in response to detecting the change in orientation of the second axis of device 400 relative to the respective vector, the interface can changing a relative size of the first and second areas 1310 and 1330 in accordance with the change in orientation of the second axis of device 400 relative to the respective vector. That is, as device 400 is tilted about the second axis, areas 1310 and 1330 change. According to embodiments, areas 1310 and 1330 are rendered using different respective colors and/or shading so that they contrast with each other. In some embodiments, area 1310 is white and area 1330 is black. In some embodiments, a first axis of device 400 is substantially horizontal and a second axis is substantially vertical. In the example of FIG. 13, value 1320 indicates that a first axis of device 400 is tilted −12 degrees relative to the respective vector, and the first axis is indicated by hash marks 1340. According to some embodiments, by default, the vector is a gravity vector, and the first axis is horizontal.

Figure 14:
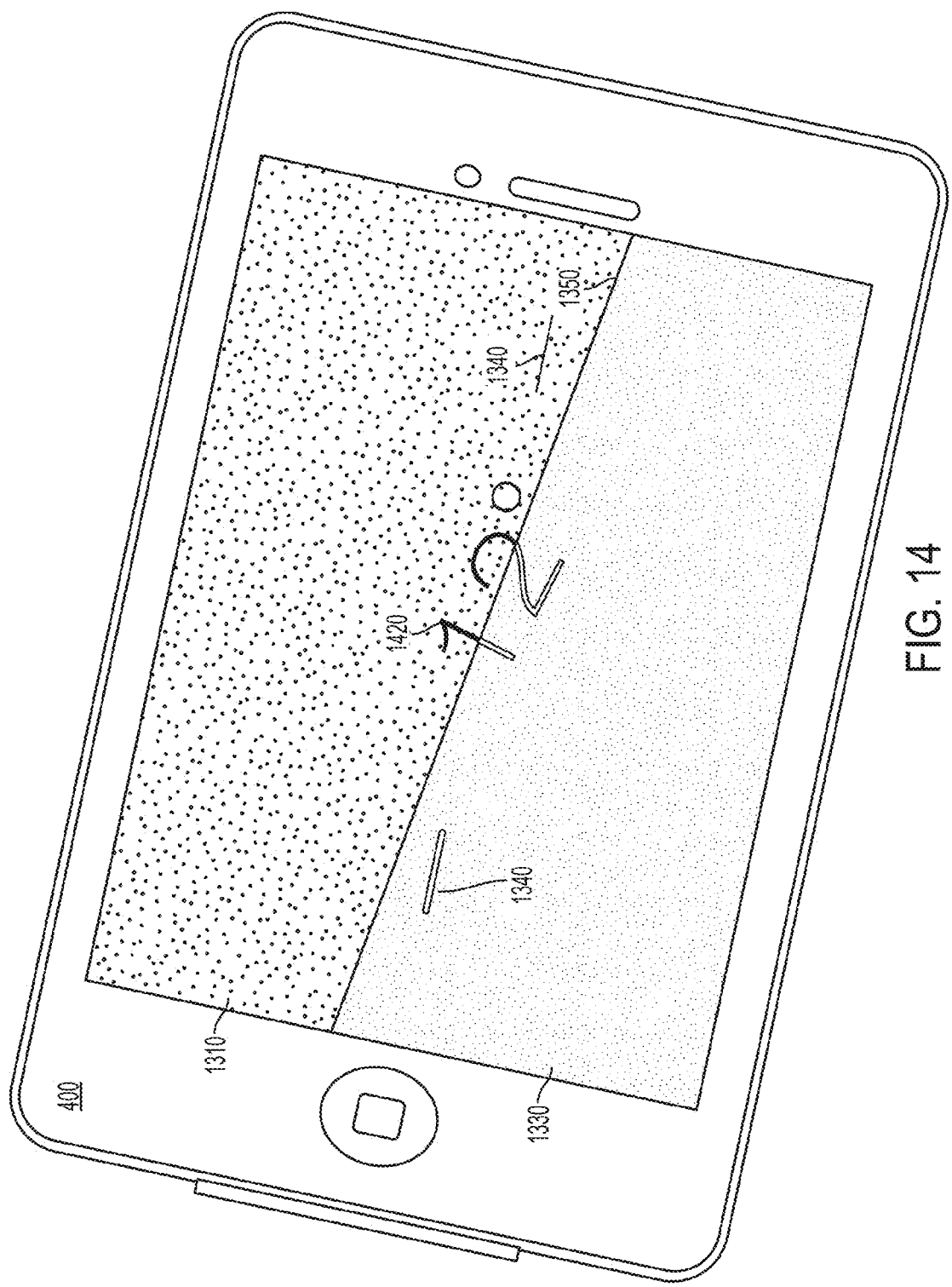

FIG. 14 shows how line 1350 and areas 1310 and 1330 change as a result of device 400 being tilted relative to the respective vector. As shown, value 1420 indicates that device 400 is currently tilted 12 degrees relative to the respective vector.

In the embodiments depicted in FIGS. 13 and 14, the respective vector can be a default vector, such as, for example, a gravity vector, and the first axis is substantially horizontal. As previously discussed with reference to block 314 shown in FIG. 3, in some embodiments, a reference axis can be selected. According to one such embodiment, the reference axis can be selected when an input is received at mobile device 400 while an edge of device 400 is tilted to be parallel to the desired reference axis. For example, a touch input such as a single-tap can be received within area 1310 or 1330 while the edge of device 400 is parallel to a desired reference axis. In this way, a user can select a new, non-default reference axis, and the interface of the spirit level application will display a straight line (see, e.g., line 1560 shown in FIGS. 15 and 16). In some embodiments where a value such as value 1420 is displayed, in response to receiving input indicating a reference axis, the value is changed to indicate the degrees of rotation needed to bring the edge of mobile device 400 into coincidence with the reference axis. According to some embodiments, if no reference axis is selected, and the respective vector is a gravity vector, the first axis is substantially horizontal and the second axis is substantially vertical (e.g., perpendicular to the first axis).

FIGS. 15 and 16 show how a reference axis can be set in response to an input. In some embodiments, the reference axis is established in response to an input received at device 400 while an edge of the device is parallel to or aligned with the reference axis. As shown in FIG. 15, in response to receiving an input indicating the reference axis, straight line 1560 is displayed that divides areas 1310 and 1330 such that the angle of line 1560 indicates orientation of an edge of device 400 relative to the user-selected reference axis while maintaining display of hash marks 1340 indicating the reference axis. In the example of FIG. 15, value 1520 indicates that device 400 is currently tilted −16 degrees relative to the reference axis. When a reference axis is selected, hash marks 1340 indicate the reference axis and as device 400 is tilted relative to the reference axis, an area 1570 can be displayed that represents the tilt of the edge of device 400 relative to the reference axis. As shown, area 1570 is bounded by line 1350, line 1560, and the edge areas 1310 and 1330. In some embodiments, the colors of areas 1310, 1330 and 1570 differ from each other so that the three areas contrast with each other while being simultaneously displayed. According to one such embodiment, area 1570 is red, area 1310 is white, and area 1330 is black. In some embodiments, after a reference axis is selected, a subsequent input can indicate that the spirit level application is to revert to the default first axis. For example, after selecting a reference axis, a user can single-tap anywhere within area 1310, 1330 or 1570 to revert back to using the default first axis (e.g., a horizontal axis).

FIG. 16 shows how line 1560 and areas 1570, 1310 and 1330 change as a result of mobile device 400 being tilted along the user-selected reference axis and the second axis relative to the vector. In particular, line 1560 is almost parallel to hash marks 1340 to indicate that the edge of device 400 is close to being parallel to the reference axis. In addition, area 1310 has shrunk and area 1330 has expanded by a corresponding amount to indicate that mobile device 400 has been tilted along the second axis relative to the vector. FIG. 16 also shows that value 1620 indicates that device 400 is currently tilted −1 degrees relative to the reference axis.

Figure 17:
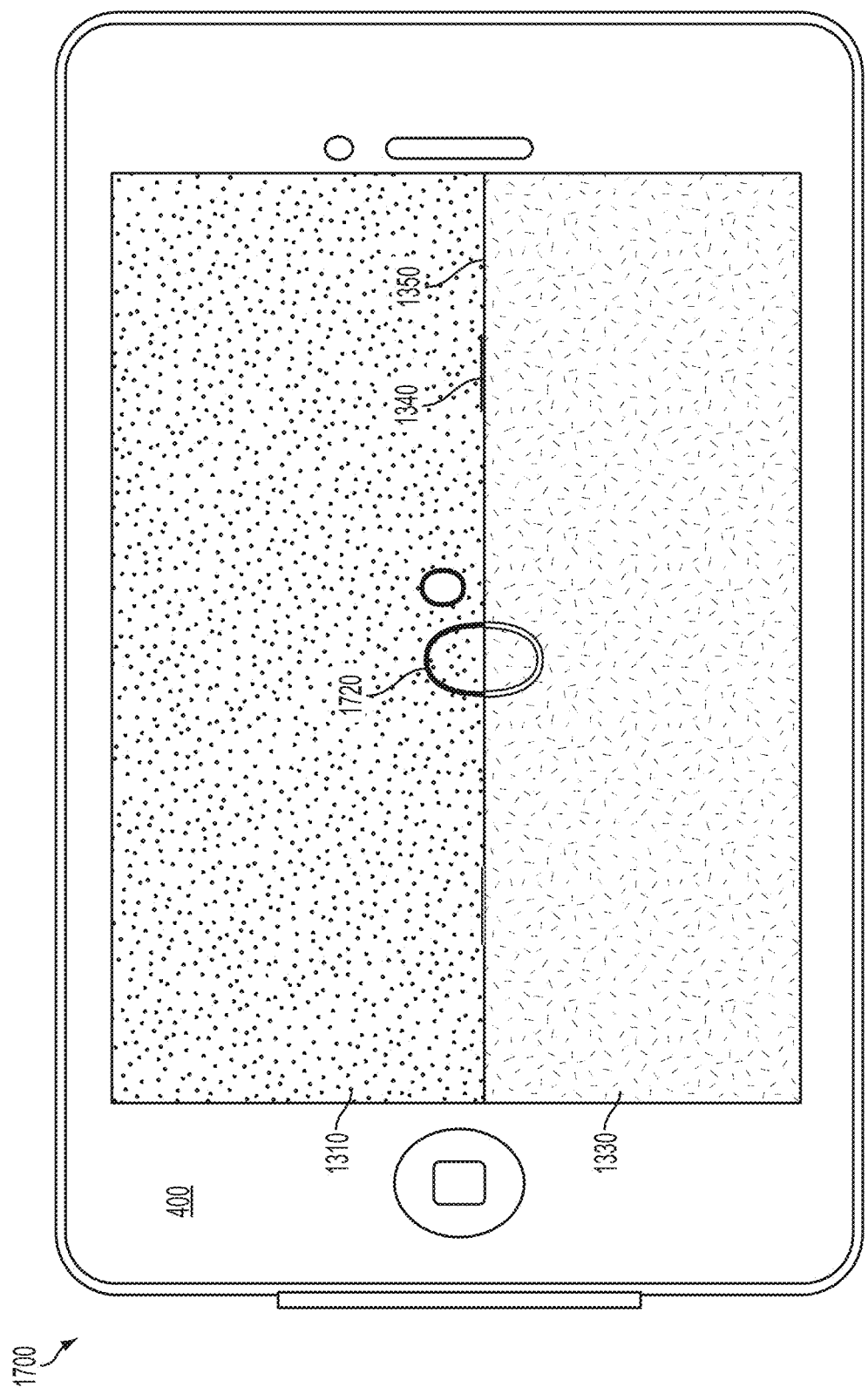

FIG. 17 shows a vertical mode interface of the spirit level application when an edge of mobile device 400 is perpendicular to the respective vector. The vector can be the default gravity vector, and the first axis can be a default horizontal axis, or, in cases where a reference axis has been selected, an indication of a user-selected reference axis can be displayed. As shown in FIG. 17, when value 1720 is zero degrees, line 1350 is aligned with hash marks 1340. FIG. 17 also shows how color and/or shading can be used to indicate that the edge of device 400 is perpendicular to the respective vector. In some embodiments, the color of area 1330 changes to green indicate that the edge of mobile device 400 is perpendicular to the vector (or aligned with the reference axis if one has been selected). When device 400 is oriented such that the second axis is perpendicular to the vector, areas 1310 and 1330 will occupy equal areas of the display.

As described above with reference to FIGS. 8 and 12, the visual indications that the edge of device 400 is perpendicular to the respective vector in the vertical mode shown in FIG. 17 can have a certain amount of stickiness as value 1720 approaches zero. For instance, in cases where the respective vector is a gravity vector, when the device's edge is tilted to be nearly perpendicular to the gravity vector (e.g., level), an embodiment can visually snap value 1720 directly to zero in order to reduce visible noise in the user interface. For example, this can be done when value 1720 is within a quarter of a degree of zero. In some embodiments, after value 1720 has been snapped to zero, device 400 will not exit or escape the sticky state until the device's edge is tilted by a set amount. For the example, areas 1310 and 1330 may continue to occupy equal areas of the display and the color of area 1330 may remain green until the edge of the device is tilted to be more than a quarter of a degree out of alignment with the respective vector. Embodiments smooth value 1720 on both sides of zero (positive and negative) so that a relatively small amount of ramping of value 1720 as it approaches zero is not discernible by a user.

In some embodiments, in response to determining that the orientation of the surface of device 400 relative to the respective vector has fallen below a predetermined threshold, the vertical mode shown in FIGS. 13-17 is automatically transitioned to a second, horizontal mode shown in FIGS. 4-12. With reference to the example embodiments of FIGS. 5 and 13, the transitioning can include displaying a first bounded shape 410 and a second bounded shape 430, and changing positions of the bounded shapes 410 and 430 with respect to each other along one or more axes 406 and 408 in response to a change in orientation of device 400 relative to the respective vector. The transitioning can further comprise ceasing to display hash marks 1340 and line 1350 as the bounded shapes 410 and 430 are displayed. In some embodiments, the transitioning also includes in response to detecting a first change in orientation of the device 400, increasing the size of first area 1310 relative to second area 1330. After increasing the size of first area 1310 relative to second area 1330, and in response to detecting the second change in orientation of device 400, the transitioning includes ceasing to display second area 1330, and after ceasing to display second area 1330. Next, in response to detecting a third change in orientation of device 400, the transitioning can include displaying at least a portion of the first bounded shape 410 and displaying at least a portion of the second bounded shape 430.

Figure 18:
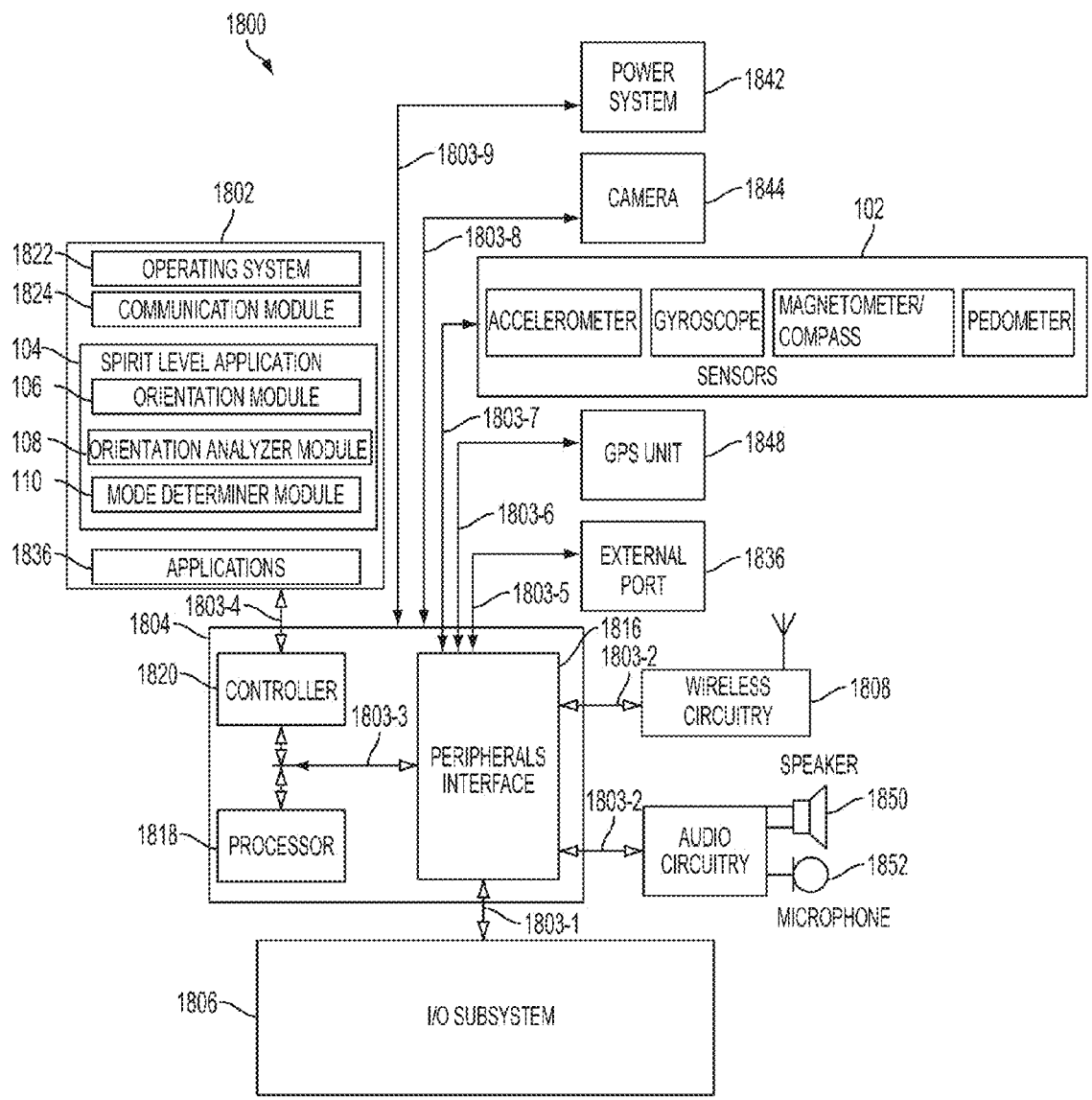
FIG. 18 illustrates a mobile device that can be used according to some embodiments of the present invention.

FIG. 18 is a block diagram of a portable electronic device or computing device 1800 according to an embodiment of the invention. Aspects of computing device 1800 also apply to a server. Computing device 1800 generally includes computer-readable medium 1802, a processing system 1804, an Input/Output (I/O) subsystem 1806, wireless circuitry 1808, and audio circuitry 1810 including speaker 1850 and microphone 1852. These components may be coupled by one or more communication buses or signal lines 1803. Computing device 1800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 18 is only one example of an architecture for computing device 1800, and that computing device 1800 can have more or fewer components than shown, or a different configuration of components. The various components shown in FIG. 18 can be implemented in hardware, software, or a combination of both hardware and software, including one or more signal processing and/or application specific integrated circuits.

Wireless circuitry 1808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE Advanced) can be used depending on the type of communication or the range of the communication.

Wireless circuitry 1808 is coupled to processing system 1804 via peripherals interface 1816. Interface 1816 can include conventional components for establishing and maintaining communication between peripherals and processing system 1804. Voice and data information received by wireless circuitry 1808 (e.g., in speech recognition or voice command applications) is sent to one or more processors 1818 via peripherals interface 1816. One or more processors 1818 are configurable to process various data formats for one or more application programs 1836 stored on medium 1802.

Peripherals interface 1816 couple the input and output peripherals of the device to processor 1818 and computer-readable medium 1802. One or more processors 1818 communicate with computer-readable medium 1802 via a controller 1820. Computer-readable medium 1802 can be any device or non-transitory medium that can store code and/or data for use by one or more processors 1818. For example, computer-readable medium 1802 can be a non-transitory machine-readable medium including instructions configured to cause a data processing apparatus such as computing device 1800 to perform operations. Also, for example, computer-readable medium 1802 can be a non-transitory computer-readable storage medium containing instructions configured to cause one or more processors 1818 to perform operations. Computer-readable medium 1802 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1816, one or more processors 1818, and memory controller 1820 can be implemented on a single chip, such as processing system 1804. In some embodiments, they can be implemented on separate chips.

Computing device 1800 also includes a power system 1842 for powering the various hardware components. Power system 1842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, computing device 1800 includes a camera 1844. In some embodiments, computing device 1800 includes sensors 102. Sensors can include accelerometers, magnetometers, compasses, gyroscopes, pedometers, pressure sensors, audio sensors, light sensors, barometers, and the like. Sensors 102 can be used to sense location aspects, such as auditory or light signatures of a location.

In some embodiments, computing device 1800 can include a GPS receiver, sometimes referred to as a GPS unit 1848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1818 run various software components stored in medium 1802 to perform various functions for computing device 1800. In some embodiments, the software components include an operating system 1822, a communication module (or set of instructions) 1824, spirit level application 104, an orientation module (or set of instructions) 106, an orientation analyzer module (or set of instructions) 108, a mode determiner module (or set of instructions) 110, and other applications (or set of instructions) 1836.

Operating system 1822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1824 facilitates communication with other devices over one or more external ports 1836 or via wireless circuitry 1808 and includes various software components for handling data received from wireless circuitry 1808 and/or external port 1836. External port 1836 (e.g., USB, Fire Wire, Lightning connector, 30-pin connector, etc.) is adapted for coupling directly to other devices or indirectly over a network (e.g., the Internet, wireless LAN, etc.).

In some embodiments, orientation module 106 can assist in enabling spirit level application 104, as well as other applications 1836 executing on the mobile device 1800, to use sensor data to determine an orientation of the mobile device. In some embodiments, data from sensors 102 can be used by orientation module 106 to determine an orientation of mobile device 1800 relative to one or more axes. In some embodiments, orientation analyzer module 108 can also use sensors 102 to determine the physical tilt or orientation of a surface or edge of mobile device 1800 relative to a respective vector. Additionally, mode determiner module 110 can use sensor data from sensors 102 to determine a functional mode for spirit level application 104 based in part on the orientation of mobile device 1800 relative to a respective vector (e.g., a gravity vector). For example, based on a predetermined vertical orientation threshold, mode determiner module 110 can determine if spirit level application 104 should present a vertical mode interface or a horizontal mode interface.

The one or more application programs 1836 on the mobile device can include any applications installed on the computing device 1800, including without limitation, spirit level application 104, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in some embodiments.

In some embodiments, I/O subsystem 1806 can include a display and user input devices such as a keyboard, mouse, and/or trackpad. In some embodiments, I/O subsystem 1806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, computing device 1800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Some embodiments of the invention increase the ease of using sensor data to present the interface of a spirit level application. Some embodiments of the invention use graphical elements and color to indicate when a surface of a mobile device is perpendicular to a gravity vector (e.g., level) or aligned with or parallel to the gravity vector (e.g., plumb). Additional embodiments of the invention use graphical elements and color to indicate when a surface of the mobile device is aligned with or parallel to a reference axis (e.g., a user-selected reference axis). Some embodiments of the invention use a combination of graphical elements and sounds (e.g., a chime) to indicate when a surface of a mobile device is aligned with or parallel to a default first axis (e.g., a horizontal axis), a default second axis (e.g., a vertical axis), or a user-selected reference axis.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of embodiment of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A computer implemented method comprising:
at a mobile device comprising one or more processors, a display, and one or more sensors for detecting orientations of one or more axes of the mobile device:
displaying a bounded area on the display of the mobile device;
detecting, using the one or more sensors, an orientation of a first axis of a surface of the mobile device relative to a respective vector;
displaying a straight line dividing the bounded area into a first area and a second area, wherein an angle of the line indicates the orientation of the first axis of the surface of the mobile device relative to the respective vector;
while maintaining the angle of the line at a first angle and concurrently displaying a numerical value of the first angle:
detecting, using the one or more sensors, a change in an orientation of a second axis of the mobile device relative to the respective vector;
in response to detecting the change in orientation of the second axis of the mobile device relative to the respective vector, changing a relative size of the first and second areas in accordance with the change in the orientation of the second axis of the mobile device relative to the respective vector;
receiving an input indicating a user-defined reference axis of the mobile device;
displaying an indication of the user-defined reference axis while continuing to display the straight line;
after receiving the input indicating the user-defined reference axis, detecting a change in the orientation of the first axis of the surface of the mobile device relative to the respective vector; and
in response to detecting the change in the orientation of the first axis of the mobile device relative to the respective vector:
changing the angle of the straight line in accordance with the change in orientation of the first axis of the mobile device relative to the respective vector while maintaining display of the indication of the user-defined reference axis.

2. The method of claim 1, wherein the respective vector is a gravity vector.

3. The method of claim 1, wherein the first axis is a long axis of the device and the second axis is a short axis of the device.

4. The method of claim 1, further comprising, changing a color of one or more of the first area and the second area when the first axis of the mobile device is perpendicular to the respective vector.

5. The method of claim 1, wherein the input is a touch input within the bounded area while the user-defined reference axis is perpendicular to the respective vector.

6. The method of claim 1, further comprising:
changing the numerical value in response to changes in orientation of the first axis of the mobile device relative to the respective vector.

7. The method of claim 6, wherein the numerical value represents a difference, in degrees, between the orientation of the first axis of the mobile device and the respective vector.

8. The method of claim 6, further comprising:
in response to detecting the change in orientation of the first axis of the mobile device relative to the respective vector:
displaying a value indicative of the orientation of the user-defined reference axis of the mobile device relative to the respective vector; and
changing the value to match the changed orientation of the straight line.

9. The method of claim 1, further comprising:
determining an orientation of the surface of the mobile device relative to the respective vector;
in response to determining that the orientation of the surface relative to the respective vector has reached a predetermined threshold, transitioning the display to a second mode, wherein the transitioning comprises:
displaying, on the display of the mobile device, a first bounded shape and a second bounded shape; and
changing positions of both the first bounded shape and the second bounded shape along one or more axes in response to a change in orientation of the mobile device relative to the respective vector.

10. The method of claim 9, wherein:
the first and second bounded shapes are aligned along an object axis that indicates an orientation of the first axis of the mobile device relative to the respective vector; and
a distance between the first bounded shape and the second bounded shape indicates an orientation of a third axis of the mobile device relative to the respective vector.

11. The method of claim 9, wherein the transitioning further comprises:

ceasing to display the straight line as the bounded shapes are displayed.

12. The method of claim 9, wherein the transitioning further comprises:
   detecting a first change in orientation of the mobile device in a first direction;
   in response to detecting the first change in orientation of the mobile device, increasing a size of the first area relative to the second area;
   after increasing the size of the first area relative to the second area, detecting a second change in orientation of the mobile device in the first direction;
   in response to detecting the second change in orientation of the mobile device, ceasing to display the second area;
   after ceasing to display the second area, detecting a third change in orientation of the mobile device in the first direction; and
   in response to detecting the third change in orientation of the mobile device, displaying at least a portion of the first bounded shape and displaying at least a portion of the second bounded shape.

13. A non-transitory machine-readable storage medium embodying a computer program product including instructions that, when executed by a mobile device comprising one or more processors, a display, and one or more sensors for detecting orientations of one or more axes of the mobile device, cause the mobile device to:
   display a bounded area on the display of the mobile device;
   detect, using the one or more sensors, an orientation of a first axis of a surface of the mobile device relative to a respective vector;
   display a straight line dividing the bounded area into a first area and a second area, wherein an angle of the line indicates the orientation of the first axis of the surface of the mobile device relative to the respective vector;
   while maintaining the angle of the line at a first angle and concurrently displaying a numerical value of the first angle:
      detect, using the one or more sensors, a change in an orientation of a second axis of the mobile device relative to the respective vector;
      in response to detecting the change in orientation of the second axis of the mobile device relative to the respective vector, changing a relative size of the first and second areas in accordance with the change in the orientation of the second axis of the mobile device relative to the respective vector;
   receive an input indicating a user-defined reference axis of the mobile device;
   display an indication of the user-defined reference axis while continuing to display the straight line;
   after receiving the input indicating the user-defined reference axis, detect a change in the orientation of the first axis of the surface of the mobile device relative to the respective vector; and
   in response to detecting the change in the orientation of the first axis of the mobile device relative to the respective vector:
      change the angle of the straight line in accordance with the change in orientation of the first axis of the mobile device relative to the respective vector while maintaining display of the indication of the user-defined reference axis.

14. The non-transitory machine-readable storage medium of claim 13, wherein the respective vector is a gravity vector.

15. The non-transitory machine-readable storage medium of claim 13, wherein the first axis is a long axis of the device and the second axis is a short axis of the device.

16. The non-transitory machine-readable storage medium of claim 13, further including instructions that cause the mobile device to:
   change a color of one or more of the first area and the second area when the first axis of the mobile device is perpendicular to the respective vector.

17. The non-transitory machine-readable storage medium of claim 13, wherein the input is a touch input within the bounded area while the user-defined reference axis is perpendicular to the respective vector.

18. The non-transitory machine-readable storage medium of claim 13, further including instructions that cause the mobile device to:
   change the numerical value in response to changes in orientation of the first axis of the mobile device relative to the respective vector.

19. The non-transitory machine-readable storage medium of claim 18, wherein the numerical value represents a difference, in degrees, between the orientation of the first axis of the mobile device and the respective vector.

20. The non-transitory machine-readable storage medium of claim 18, further including instructions that cause the mobile device to:
   in response to detecting the change in orientation of the first axis of the mobile device relative to the respective vector:
      display a value indicative of the orientation of the user-defined reference axis of the mobile device relative to the respective vector; and
      change the value to match the changed orientation of the straight line.

21. The non-transitory machine-readable storage medium of claim 13, further including instructions that cause the mobile device to:
   determine an orientation of the surface of the mobile device relative to the respective vector;
   in response to determining that the orientation of the surface relative to the respective vector has reached a predetermined threshold, transition the display to a second mode, wherein the transitioning comprises:
      displaying, on the display of the mobile device, a first bounded shape and a second bounded shape; and
      changing positions of both the first bounded shape and the second bounded shape along one or more axes in response to a change in orientation of the mobile device relative to the respective vector.

22. The non-transitory machine-readable storage medium of claim 21, wherein:
   the first and second bounded shapes are aligned along an object axis that indicates an orientation of the first axis of the mobile device relative to the respective vector; and
   a distance between the first bounded shape and the second bounded shape indicates an orientation of a third axis of the mobile device relative to the respective vector.

23. The non-transitory machine-readable storage medium of claim 21, wherein the transitioning further comprises:
   ceasing to display the straight line as the bounded shapes are displayed.

24. The non-transitory machine-readable storage medium of claim 21, wherein the transitioning further comprises:
   detecting a first change in orientation of the mobile device in a first direction;

in response to detecting the first change in orientation of the mobile device, increasing a size of the first area relative to the second area;
after increasing the size of the first area relative to the second area, detecting a second change in orientation of the mobile device in the first direction;
in response to detecting the second change in orientation of the mobile device, ceasing to display the second area;
after ceasing to display the second area, detecting a third change in orientation of the mobile device in the first direction; and
in response to detecting the third change in orientation of the mobile device, displaying at least a portion of the first bounded shape and displaying at least a portion of the second bounded shape.

25. A mobile device, comprising:
one or more processors;
a display;
one or more sensors for detecting orientations of one or more axes of the mobile device;
memory; and
one or more programs stored in the memory, the one or more programs storing instructions that cause the one or more processors to perform operations including:
displaying a bounded area on the display of the mobile device;
detecting, using the one or more sensors, an orientation of a first axis of a surface of the mobile device relative to a respective vector;
displaying a straight line dividing the bounded area into a first area and a second area, wherein an angle of the line indicates the orientation of the first axis of the surface of the mobile device relative to the respective vector;
while maintaining the angle of the line at a first angle and concurrently displaying a numerical value of the first angle:
detecting, using the one or more sensors, a change in an orientation of a second axis of the mobile device relative to the respective vector;
in response to detecting the change in orientation of the second axis of the mobile device relative to the respective vector, changing a relative size of the first and second areas in accordance with the change in the orientation of the second axis of the mobile device relative to the respective vector;
receiving an input indicating a user-defined reference axis of the mobile device;
displaying an indication of the user-defined reference axis while continuing to display the straight line;
after receiving the input indicating the user-defined reference axis, detecting a change in the orientation of the first axis of the surface of the mobile device relative to the respective vector; and
in response to detecting the change in the orientation of the first axis of the mobile device relative to the respective vector:
changing the angle of the straight line in accordance with the change in orientation of the first axis of the mobile device relative to the respective vector while maintaining display of the indication of the user-defined reference axis.

26. The mobile device of claim 25, wherein the respective vector is a gravity vector.

27. The mobile device of claim 25, wherein the first axis is a long axis of the device and the second axis is a short axis of the device.

28. The mobile device of claim 25, the one or more programs further storing instructions that cause the one or more processors to perform operations including:
changing a color of one or more of the first area and the second area when the first axis of the mobile device is perpendicular to the respective vector.

29. The mobile device of claim 25, wherein the input is a touch input within the bounded area while the user-defined reference axis is perpendicular to the respective vector.

30. The mobile device of claim 25, the one or more programs further storing instructions that cause the one or more processors to perform operations including:
changing the numerical value in response to changes in orientation of the first axis of the mobile device relative to the respective vector.

31. The mobile device of claim 30, wherein the numerical value represents a difference, in degrees, between the orientation of the first axis of the mobile device and the respective vector.

32. The mobile device of claim 30, the one or more programs further storing instructions that cause the one or more processors to perform operations including:
in response to detecting the change in orientation of the first axis of the mobile device relative to the respective vector:
displaying a value indicative of the orientation of the user-defined reference axis of the mobile device relative to the respective vector; and
changing the value to match the changed orientation of the straight line.

33. The mobile device of claim 25, the one or more programs further storing instructions that cause the one or more processors to perform operations including:
determining an orientation of the surface of the mobile device relative to the respective vector;
in response to determining that the orientation of the surface relative to the respective vector has reached a predetermined threshold, transitioning the display to a second mode, wherein the transitioning comprises:
displaying, on the display of the mobile device, a first bounded shape and a second bounded shape; and
changing positions of both the first bounded shape and the second bounded shape along one or more axes in response to a change in orientation of the mobile device relative to the respective vector.

34. The mobile device of claim 33, wherein:
the first and second bounded shapes are aligned along an object axis that indicates an orientation of the first axis of the mobile device relative to the respective vector; and
a distance between the first bounded shape and the second bounded shape indicates an orientation of a third axis of the mobile device relative to the respective vector.

35. The mobile device of claim 33, wherein the transitioning further comprises:
ceasing to display the straight line as the bounded shapes are displayed.

36. The mobile device of claim 33, wherein the transitioning further comprises:
detecting a first change in orientation of the mobile device in a first direction;
in response to detecting the first change in orientation of the mobile device, increasing a size of the first area relative to the second area;

after increasing the size of the first area relative to the second area, detecting a second change in orientation of the mobile device in the first direction;
in response to detecting the second change in orientation of the mobile device, ceasing to display the second area;
after ceasing to display the second area, detecting a third change in orientation of the mobile device in the first direction; and
in response to detecting the third change in orientation of the mobile device, displaying at least a portion of the first bounded shape and displaying at least a portion of the second bounded shape.

\* \* \* \* \*